US012609458B2

(12) United States Patent
Xing et al.

(10) Patent No.: US 12,609,458 B2
(45) Date of Patent: Apr. 21, 2026

(54) ANTENNA AND FORMATION METHOD THEREOF, AND ANTENNA GROUP

(71) Applicant: Chengdu Tianma Micro-Electronics Co., Ltd., Chengdu (CN)

(72) Inventors: Yifan Xing, Chengdu (CN); Kerui Xi, Chengdu (CN); Baiquan Lin, Chengdu (CN); Zhenyu Jia, Chengdu (CN); Xiaonan Han, Chengdu (CN); Yi Wang, Chengdu (CN); Xiaojun Chen, Chengdu (CN); Shengwei Dai, Chengdu (CN); Taohua Chen, Chengdu (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 59 days.

(21) Appl. No.: 18/408,184

(22) Filed: Jan. 9, 2024

(65) Prior Publication Data

US 2025/0007165 A1 Jan. 2, 2025

(30) Foreign Application Priority Data

Jun. 29, 2023 (CN) ......................... 202310783413.0

(51) Int. Cl.
*H01Q 15/00* (2006.01)
*H01Q 3/36* (2006.01)
(Continued)

(52) U.S. Cl.
CPC ........... *H01Q 15/0013* (2013.01); *H01Q 3/36* (2013.01); *H01Q 9/0407* (2013.01); *H01Q 15/14* (2013.01);
(Continued)

(58) Field of Classification Search
CPC ........... H01Q 15/0013; H01Q 15/0006; H01Q 15/14; H01Q 15/148; H01Q 9/0407; H01Q 21/0087; H01Q 23/00
See application file for complete search history.

(56) References Cited

U.S. PATENT DOCUMENTS 7,245,269 B2 * 7/2007 Sievenpiper ......... H01Q 19/104 343/909
7,456,803 B1 * 11/2008 Sievenpiper ....... H01Q 15/0066 343/705

(Continued)

FOREIGN PATENT DOCUMENTS

CN 103094647 A 5/2013
CN 106299627 A 1/2017

(Continued)

*Primary Examiner* — Ab Salam Alkassim, Jr.
(74) *Attorney, Agent, or Firm* — Anova Law Group, PLLC

(57) ABSTRACT

An antenna, a formation method of the antenna, and an antenna group are provided in the present disclosure. The antenna includes a first substrate, a second substrate, a third substrate and a feed source. A first frequency selective surface is on a side of the first substrate; a reflective layer is on a side of the second substrate; a first electrode layer is on a side of the third substrate; and the third substrate is on a side of the second substrate away from the first substrate, and liquid crystal molecules are between the second substrate and the third substrate; or the third substrate is on a side of the first substrate away from the second substrate, and liquid crystal molecules are between the third substrate and the first substrate. The feed source is on the side of the second substrate or on the side of the third substrate.

8 Claims, 27 Drawing Sheets

B-B'

B-B'

(51) Int. Cl.

| | |
|---|---|
| ***H01Q 9/04*** | (2006.01) |
| ***H01Q 15/14*** | (2006.01) |
| ***H01Q 21/00*** | (2006.01) |
| ***H01Q 21/06*** | (2006.01) |
| ***H01Q 23/00*** | (2006.01) |

(52) U.S. Cl.

CPC ....... *H01Q 15/148* (2013.01); *H01Q 21/0087* (2013.01); *H01Q 21/061* (2013.01); *H01Q 23/00* (2013.01); *H01Q 15/0006* (2013.01)

(56) References Cited

U.S. PATENT DOCUMENTS

| | | | | |
|---|---|---|---|---|
| 8,872,725 | B1 * | 10/2014 | Weller | H01Q 9/285 343/756 |
| 9,780,434 | B1 * | 10/2017 | Weller | H01Q 9/065 |
| 12,294,157 | B2 * | 5/2025 | Yang | H01Q 15/0013 |
| 2007/0176832 | A1 * | 8/2007 | Qian | H01Q 21/0087 343/702 |
| 2015/0288063 | A1 * | 10/2015 | Johnson | H01Q 3/24 342/368 |
| 2018/0083364 | A1 * | 3/2018 | Foo | H01Q 15/0026 |
| 2021/0057799 | A1 * | 2/2021 | Isoyama | B60C 23/0452 |
| 2021/0194149 | A1 * | 6/2021 | Hiramatsu | H01Q 5/378 |
| 2021/0218142 | A1 * | 7/2021 | Yoshikawa | H01Q 19/005 |
| 2022/0373837 | A1 * | 11/2022 | Zhang | G02F 1/133553 |
| 2022/0384961 | A1 * | 12/2022 | Chang | H01Q 15/148 |
| 2024/0055770 | A1 * | 2/2024 | Ko | H01Q 1/38 |
| 2024/0106132 | A1 * | 3/2024 | Okita | H01Q 15/148 |
| 2024/0128652 | A1 * | 4/2024 | Okita | H01Q 15/0013 |
| 2024/0291169 | A1 * | 8/2024 | Yang | H01Q 1/38 |
| 2024/0356234 | A1 * | 10/2024 | Wu | H01Q 15/002 |
| 2024/0396195 | A1 * | 11/2024 | Wang | H01P 1/20 |

FOREIGN PATENT DOCUMENTS

| | | | | | |
|---|---|---|---|---|---|
| CN | 113725597 | A | | 11/2021 | |
| CN | 114614244 | A | | 6/2022 | |
| CN | 116565549 | A | * | 8/2023 | H01Q 1/521 |
| WO | 2022259790 | A1 | | 12/2022 | |

* cited by examiner

F–F'

S101: providing a first substrate and forming a first frequency selective surface on a side of the first substrate

↓

S102: providing a second substrate and forming a reflective layer on a side of the second substrate

↓

S103: providing a third substrate and forming a first electrode layer on a side of the third substrate

↓

S104: forming a feed source on the side of the second substrate or the third substrate

↓

S105: forming a liquid crystal cell, including forming a closed space between the third substrate and the second substrate to accommodate liquid crystal molecules through a frame adhesive, or forming a closed space between the third substrate and the first substrate to accommodate the liquid crystal molecules through a frame adhesive

FIG. 31

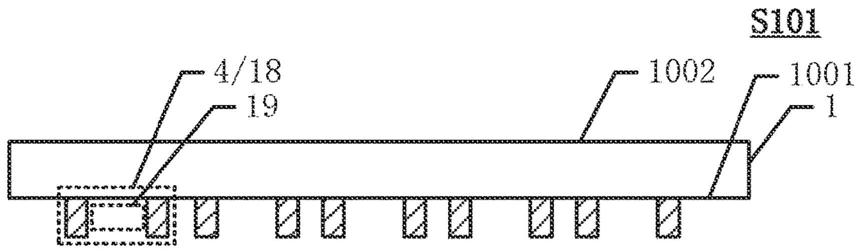

FIG. 32

ANTENNA AND FORMATION METHOD THEREOF, AND ANTENNA GROUP

CROSS-REFERENCE TO RELATED APPLICATION

The present disclosure claims the priority of Chinese Patent Application No. 202310783413.0, filed on Jun. 29, 2023, the content of which is incorporated herein by reference in its entirety.

TECHNICAL FIELD

The present disclosure generally relates to the field of communication technology and, more particularly, relates to an antenna and a formation method thereof, and an antenna group.

BACKGROUND

In the existing technology, conventional microstrip patch antennas have been deeply studied and widely used due to the advantages of low profile, light weight, easy processing and the like. However, the microstrip patch antennas have high metal ohmic loss in high frequency bands and large geometric sizes in low frequency bands, which limits development and application of the patch antennas.

Dielectric resonator antennas have attracted extensive attention due to the features of high radiation efficiency, flexible excitation manner, small size, ability to excite multiple modes, high power and the like. Conventional dielectric resonator antennas are mainly filled with dielectric invariable medium. When the antenna structure design is fixed, the dielectric resonator antenna may only work in a fixed mode, for example, only have a fixed resonance frequency and a fixed beam pointing.

Therefore, there is a need to provide a resonant cavity antenna that can realize adjustable working frequency and adjustable beam pointing.

SUMMARY

One aspect of the present disclosure provides an antenna. The antenna includes a first substrate, a second substrate and a third substrate. The first substrate and the second substrate are oppositely disposed; and a first frequency selective surface is on a side of the first substrate; a reflective layer is on a side of the second substrate; along a direction perpendicular to a plane of the first substrate, a first distance is between the first frequency selective surface and the reflective layer; and a first electrode layer is on a side of the third substrate; and the third substrate is on a side of the second substrate away from the first substrate, and liquid crystal molecules are between the second substrate and the third substrate; or the third substrate is on a side of the first substrate away from the second substrate, and liquid crystal molecules are between the third substrate and the first substrate. The antenna further includes a feed source, where the feed source is on the side of the second substrate or on the side of the third substrate.

Another aspect of the present disclosure provides an antenna group including an antenna. The antenna includes a first substrate, a second substrate and a third substrate, where the first substrate and the second substrate are oppositely disposed; and a first frequency selective surface is on a side of the first substrate; a reflective layer is on a side of the second substrate; along a direction perpendicular to a plane of the first substrate, a first distance is between the first frequency selective surface and the reflective layer; and a first electrode layer is on a side of the third substrate; and the third substrate is on a side of the second substrate away from the first substrate, and liquid crystal molecules are between the second substrate and the third substrate; or the third substrate is on a side of the first substrate away from the second substrate, and liquid crystal molecules are between the third substrate and the first substrate; and further includes a feed source, where the feed source is on the side of the second substrate or on the side of the third substrate.

Another aspect of the present disclosure provides an antenna group at least including a first antenna and a second antenna which are adjacent to each other. The first antenna is an antenna including a first substrate, a second substrate and a third substrate, where the first substrate and the second substrate are oppositely disposed; and a first frequency selective surface is on a side of the first substrate; a reflective layer is on a side of the second substrate; along a direction perpendicular to a plane of the first substrate, a first distance is between the first frequency selective surface and the reflective layer; and a first electrode layer is on a side of the third substrate; and the third substrate is on a side of the second substrate away from the first substrate, and liquid crystal molecules are between the second substrate and the third substrate; or the third substrate is on a side of the first substrate away from the second substrate, and liquid crystal molecules are between the third substrate and the first substrate; and further including a feed source, where the feed source is on the side of the second substrate or on the side of the third substrate; and the second antenna has no feed source and shares the feed source of the first antenna.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

FIG. 31 illustrates a flowchart of a formation method of an antenna according to various embodiments of the present disclosure.

FIG. 32 illustrates a cross-sectional view corresponding to S101.

DETAILED DESCRIPTION

Figure 1:
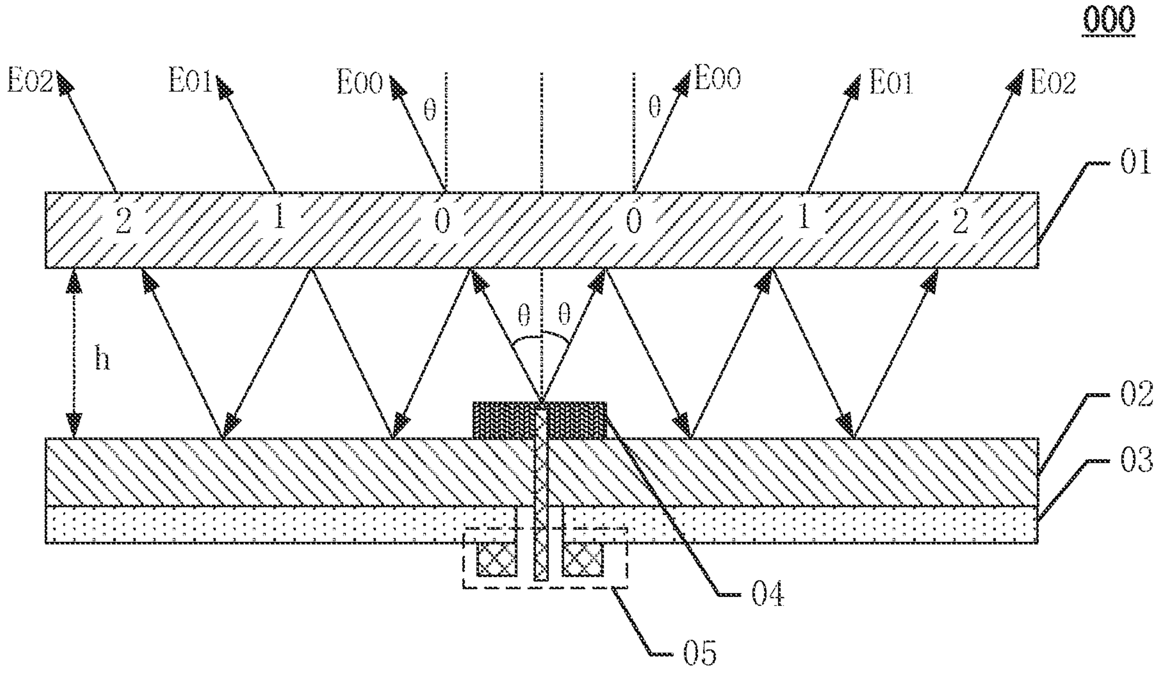
FIG. 1 illustrates a schematic of working principle of a resonant cavity antenna provided in the existing technology.

Various exemplary embodiments of the present disclosure are described in detail with reference to accompanying drawings. It should be noted that unless stated otherwise, relative arrangement of assemblies and steps, numerical expressions and values described in those embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be considered as a part of the present disclosure.

In all examples shown and discussed herein, any specific value should be interpreted as merely exemplary, rather than as a limitation. Therefore, other examples in exemplary embodiment may have different values.

It should be noted that similar reference numerals and letters are configured to indicate similar items in following drawings. Therefore, once an item is defined in one drawing, it does not need to be further discussed in subsequent drawings.

The problem that the resonant cavity antenna in the existing technology cannot adjust the working frequency and the beam pointing is described in the following. Referring to FIG. 1, FIG. 1 illustrates a schematic of the working principle of the resonant cavity antenna provided in the existing technology. In FIG. 1, the Fabry-Perot (F-P) resonant cavity antenna includes two reflective plates disposed to be in parallel with each other, which are a reflective cover plate 01 and a dielectric substrate 02 respectively; h is the distance between the reflective cover plate 01 and the dielectric substrate 02; the distance h between the reflective cover plate 01 and the dielectric substrate 02 meets a resonance condition; the side of the dielectric substrate 02 adjacent to the reflective cover plate 01 has a feed source 04; the side of the dielectric substrate 02 away from the reflective cover plate 01 has a ground layer 03; the side of the ground layer 03 away from the dielectric substrate 02 has a feed connector 05; and the feed connector 05 transmits the electromagnetic wave to the feed source 04, which may make the electromagnetic wave enter the resonant cavity. In FIG. 1, the beam pointing is θ; and E00, E01, and E02 are radiated energy at positions 0, 1 and 2. For example, a part of the electromagnetic wave is emitted through the reflective cover plate 01 at the position 0; and the energy is E00; a part of the electromagnetic wave is reflected back to the dielectric substrate 02 at the position 0, reflected on the surface of the dielectric substrate 02, and then emitted at the position 1 of the reflective cover plate 01; and the energy is E01; and a part of the electromagnetic wave is reflected back to the dielectric substrate 02 at the position 1, reflected on the surface of the dielectric substrate 02, and then emitted at the position 2 of the reflective cover plate 01; and the energy is E02. When the distance between the upper reflective plate (the reflective cover plate 01) and the lower reflective plate (the dielectric substrate 02) satisfies the resonance condition, the electromagnetic wave is continuously reflected in the resonant cavity. The electromagnetic waves transmitted through the upper reflective plate each time may be superimposed in phase, thereby increasing the antenna gain and sharpening the beam width. The resonance condition is:

$$\frac{4\pi}{\lambda}\cdot h\cdot\cos\theta-\Phi1-\Phi2=0$$

where $\lambda$ is a working wavelength; h is a height of the resonant cavity; $\theta$ is a beam pointing; $\varphi 1$ is a reflective phase of the upper reflective plate; and $\varphi 2$ is a reflective phase of the lower reflective plate. It may be seen that when the resonant cavity structure is fixed, the resonant cavity height h is fixed, the reflective phase $\varphi 1$ of the upper reflective plate is fixed, the reflective phase $\varphi 2$ of the lower reflective plate is fixed and the beam pointing $\theta$ is fixed, such that the working wavelength $\lambda$ is also fixed, and the working frequency is also fixed. In short, after the resonant cavity structure is fixed, its working frequency and beam pointing are fixed, and the antenna can only be used in a fixed working mode.

The present disclosure provides an antenna and its formation method, and an antenna group, which are configured to adjust the working frequency and beam pointing, thereby making antenna application more flexible.

Figure 2:
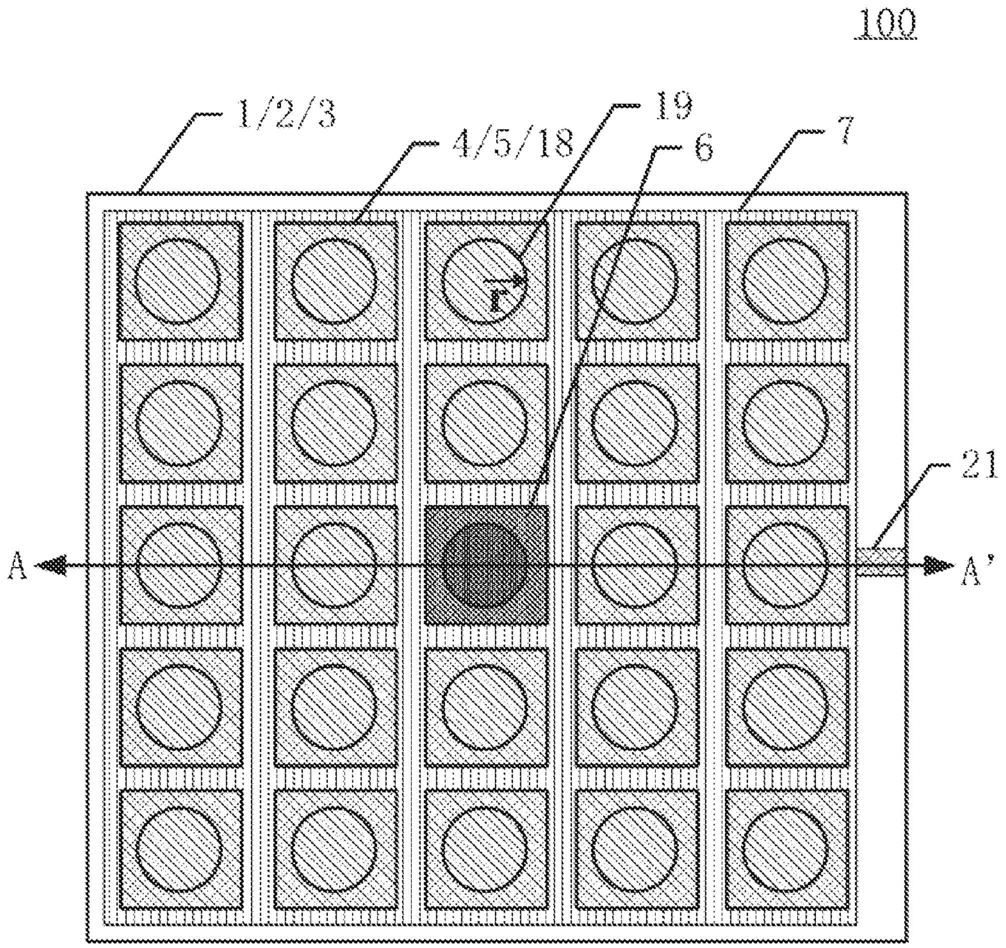
FIG. 2 illustrates a planar structural schematic of an antenna according to various embodiments of the present disclosure.
Figure 3:
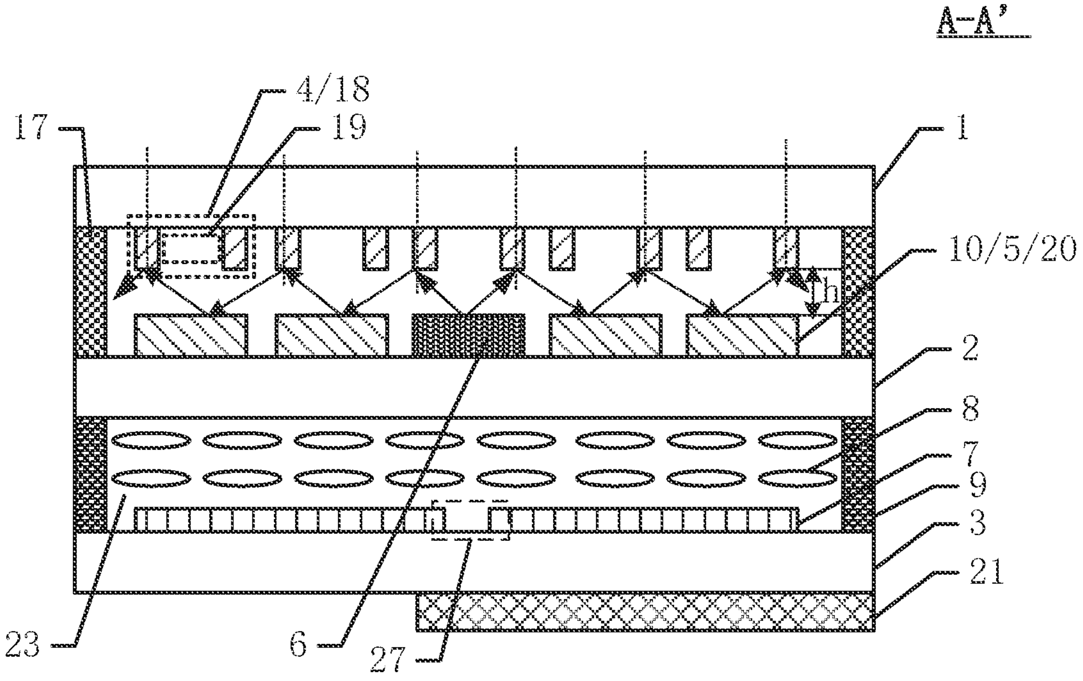
FIG. 3 illustrates a cross-sectional view along an A-A' direction in FIG. 2.
Figure 4:
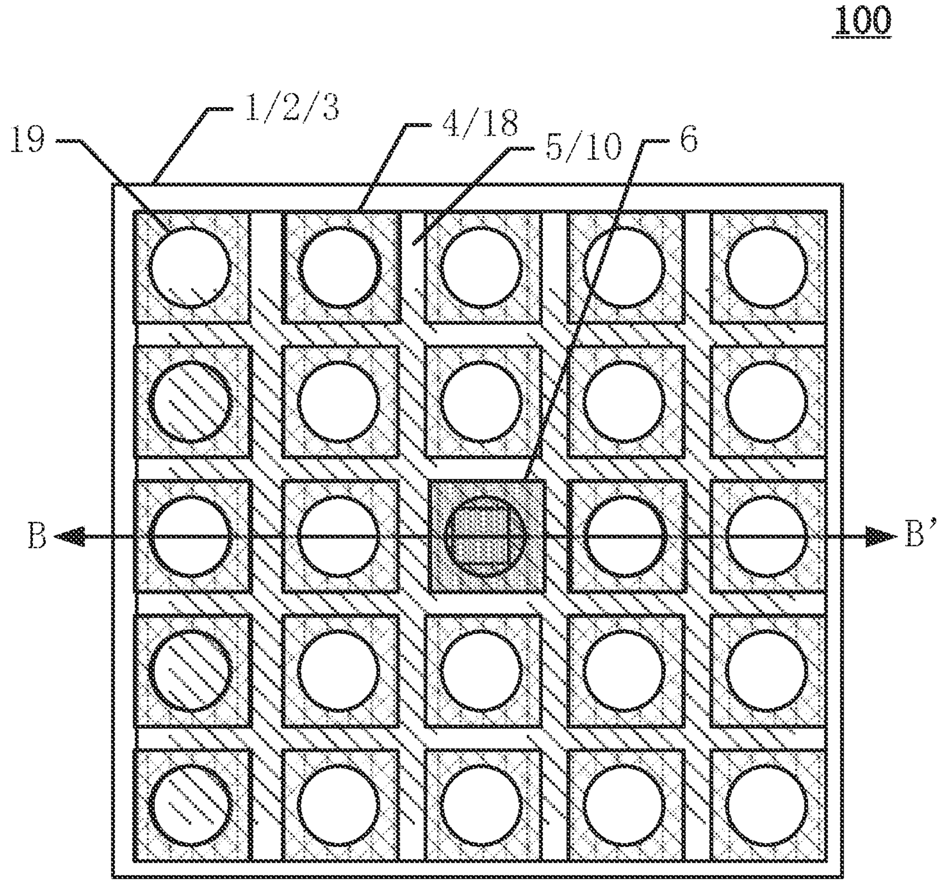
FIG. 4 illustrates another planar structural schematic of an antenna according to various embodiments of the present disclosure.
Figure 5:
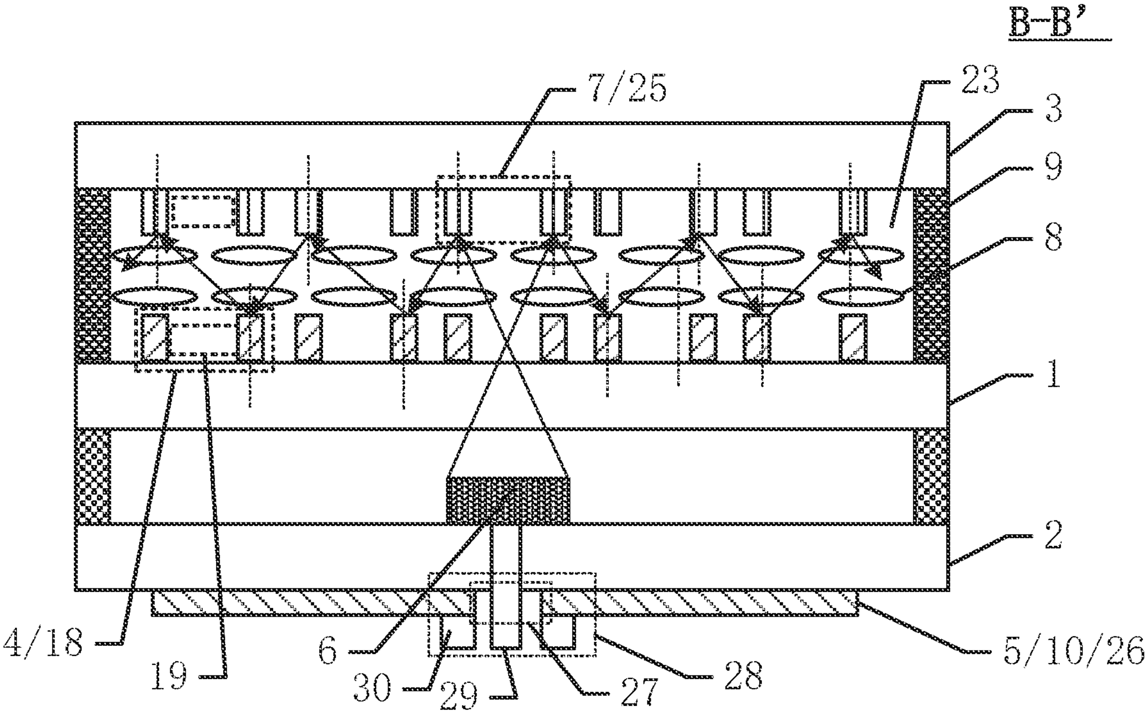
FIG. 5 illustrates a cross-sectional view along a B-B' direction in FIG. 4.

Referring to FIGS. 2-5, FIG. 2 illustrates a planar structural schematic of an antenna according to various embodiments of the present disclosure; FIG. 3 illustrates a cross-sectional view along an A-A' direction in FIG. 2; FIG. 4 illustrates another planar structural schematic of an antenna according to various embodiments of the present disclosure; and FIG. 5 illustrates a cross-sectional view along a B-B' direction in FIG. 4. An antenna 100 provided by the present disclosure may include a first substrate 1, a second substrate 2 and a third substrate 3. The first substrate 1 may be disposed to be opposite to the second substrate 2, and a side of the first substrate 1 may include a first frequency selective surface 4; a side of the second substrate 2 may include a reflective layer 5, and along a direction perpendicular to the plane where the first substrate 1 is located, a first distance h may be between the first frequency selective surface 4 and the reflective layer 5; a side of the third substrate 3 may include a first electrode layer 7; the third substrate 3 may be on the side of the second substrate 2 away from the first substrate 1, and liquid crystal molecules 8 may be between the second substrate 2 and the third substrate 3; or the third substrate 3 may be on the side of the first substrate 1 away from the second substrate 2, and liquid crystal molecules 8 may be between the third substrate 3 and the first substrate 1; and the antenna 100 may further include a feed source 6, where the feed source 6 may be on a side of the second substrate 2, or the feed source 6 may be on a side of the third substrate 3.

For example, the first substrate 1 may be a glass substrate, which may not be limited herein. A side of the first substrate 1 may include the first frequency selective surface 4. The first frequency selective surface 4 may be a two-dimensional periodic array structure. Optionally, the first frequency selective surface 4 may be a patch type, that is, same metal units may be periodically patched on a medium surface; or the first frequency selective surface 4 may be a groove type, that is, some metal unit grooves may be periodically opened on a metal plate. In one embodiment, the groove type of the first frequency selective surface 4 is taken merely as an example for illustration. In another embodiment of the present disclosure, the first frequency selective surface 4 is a patch type, which is not shown in drawings. The first frequency selective surface 4 may be on the side of the first substrate 1 away from the second substrate 2 or may be on the side of the first substrate 1 adjacent to the second substrate 2, which may not be limited herein. In FIG. 3, the first frequency selective surface 4 is on the side of the first substrate 1 adjacent to the second substrate 2 merely as an example for illustration.

Optionally, the second substrate 2 may be a glass substrate, which may not be limited herein; and pattern filling may not be performed on the second substrate 2 in FIGS. 3 and 5. A side of the second substrate 2 may include the reflective layer 5 for reflecting the electromagnetic waves. The material of the reflective layer 5 may be a metal layer, which may not be limited herein. Optionally, the reflective layer 5 may be on the side of the second substrate 2 adjacent to the first substrate 1, or on the side of the second substrate 2 away from the first substrate 1, which may not be limited herein. In FIG. 3, the reflective layer 5 is on the side of the second substrate 2 adjacent to the first substrate 1 merely as an example for illustration. In another embodiment of the present disclosure, the reflective layer 5 may be on the side of the second substrate 2 away from the first substrate 1.

Along the direction perpendicular to the plane where the first substrate 1 is located, the first distance h may be between the first frequency selective surface 4 and the reflective layer 5. The first distance h between the first frequency selective surface 4 and the reflective layer 5 may form a resonant cavity to ensure that electromagnetic waves are reflected multiple times between the first frequency selective surface 4 and the reflective layer 5. The first distance h in the present disclosure refers to the distance between the side surface of the first frequency selective surface 4 adjacent to the reflective layer 5 and the side surface of the reflective layer 5 adjacent to the first frequency selective surface 4, that is, the minimum distance between the first frequency selective surface 4 and the reflective layer 5. Obviously, the antenna 100 may also include the feed source 6. The feed source 6 may be on the side of the second substrate 2 or on the side of the third substrate 3 of the feed source 6. The feed source 6 may be on the side of the second substrate 2 adjacent to the first substrate 1 or may be on the side of the second substrate 2 away from the first substrate 1; or the feed source 6 may be on the side of the third substrate 3 adjacent to the second substrate 2 or may be on the side of the third substrate 3 away from the second substrate 2, which may not be limited herein. After an electromagnetic wave signal is fed to the feed source 6, the feed source 6 may radiate the electromagnetic wave signal. When the electromagnetic wave signal passes through the first frequency selective surface 4, a part of the electromagnetic waves may be emitted out; and a part of the electromagnetic waves may be reflected back to the reflective layer 5 and also reflected on the surface of the reflective layer 5, and then emitted through the first frequency selective surface 4.

The present disclosure may also include the third substrate 3. The side of the third substrate 3 may include the first electrode layer 7. The third substrate 3 may be on the side of the second substrate 2 away from the first substrate 1, and the liquid crystal molecules 8 may be between the second substrate 2 and the third substrate 3; or the third substrate 3 may be on the side of the first substrate 1 away from the second substrate 2, and the liquid crystal molecules 8 may be between the third substrate 3 and the first substrate 1. In FIGS. 2 and 3, the third substrate 3 is on the side of the second substrate 2 away from the first substrate 1, and the liquid crystal molecules 8 are between the second substrate 2 and the third substrate 3. In FIGS. 4 and 5, the third substrate 3 is on the side of the first substrate 1 away from the second substrate 2, and liquid crystal molecules 8 are between the third substrate 3 and the first substrate 1.

Optionally, for one embodiment in FIG. 3, a first frame adhesive 9 may be further included between the second substrate 2 and the third substrate 3, such that a closed space may be formed between the second substrate 2 and the third substrate 3 to accommodate the liquid crystal molecules. 8; and for one embodiment in FIG. 5, the first frame adhesive 9 may be included between the first substrate 1 and the third substrate 3, such that a closed space may be formed between the first substrate 1 and the third substrate 3 to accommodate the liquid crystal molecules 8.

Referring to FIGS. 2 and 3, the first frequency selective surface 4 may be disposed on the side of the first substrate 1 adjacent to the second substrate 2, the reflective layer 5 may be disposed on the side of the second substrate 2 adjacent to the first substrate 1, and the feed source 6 may be disposed on the side of the second substrate 2 adjacent to the first substrate 1. After the feed source 6 receives the electromagnetic wave signal, the electromagnetic waves may be emitted from the feed source 6 to the first frequency selective surface 4. The first frequency selective surface 4 has semi-reflective and semi-transparent effect. A part of the electromagnetic waves may emit the first frequency selective surface 4 corresponding to the position of the feed source 6, and the other part of the electromagnetic waves may be reflected back to the reflective layer 5. The first frequency selective surface 4 may include a plurality of second electrode blocks 18 having through holes 19. The transmittance coefficient of the first frequency selective surface 4 may be related to the length and width of the second electrode block 18 and the radius r of the through hole 19. The reflective layer 5 may have reflective effect and reflect the other part of the electromagnetic waves back to the first frequency selective surface 4. In such way, the electromagnetic waves may be continuously reflected in the resonant cavity, and the electromagnetic waves transmitted through the first frequency selective surface 4 of the upper layer may be superimposed in phase each time, thereby increasing the gain of the antenna 100 and sharpening the beam width. The present disclosure may also include the third substrate 3. The third substrate 3 may be on the side of the second substrate 2 away from the first substrate 1, the liquid crystal molecules 8 may be between the second substrate 2 and the third substrate 3, and the side of the third substrate 3 adjacent to the second substrate 2 may be disposed with a first an electrode layer 7. When a voltage difference is between the reflective layer 5 and the first electrode layer 7 to form an electric field, the liquid crystal molecules 8 may be deflected. Since the deflection degrees of the liquid crystal molecules 8 varies with the applied voltage, the dielectric constant of the liquid crystal molecules 8 between the reflective layer 5 and the first electrode layer 7 may be controlled to be adjusted. Therefore, the equivalent dielectric constant of the structure of the reflective layer 5 may be controlled to be adjusted, and the reflective phase φ2 of the reflective layer 5 may be adjusted. The resonance condition is:

$$\frac{4\pi}{\lambda}\cdot h\cdot\cos\,\theta-\Phi1-\Phi2=0$$

where λ is the working wavelength; h is the height of the resonant cavity; θ is the beam pointing; φ1 is the reflective phase of the upper reflective plate; φ2 is the reflective phase of the lower reflective plate. It may be seen that when the height h of the resonant cavity remains unchanged and φ2 is adjustable, resonance adjustment may be satisfied by only adjusting the working wavelength and beam pointing. The working wavelength λ may be adjustable. The working frequency is equal to the reciprocal of the working wavelength, such that the working frequency may be adjustable; and the beam pointing θ may be also adjustable. Therefore, the adjustment of the working frequency and the beam pointing of the antenna 100 may be realized, such that the working mode of the antenna 100 may be no longer fixed with more flexible application.

Referring to FIGS. 4 and 5, the side of the first substrate 1 away from the second substrate 2 may be disposed with the first frequency selective surface 4; the side of the second substrate 2 adjacent to the first substrate 1 may be disposed with the feed source 6; the third substrate 3 may be on the side of the first substrate 1 away from the second substrate 2; and the side of the third substrate 3 adjacent to the second substrate 2 may include the first electrode layer 7. Optionally, the first electrode layer 7 may include a semi-reflective semi-transparent second frequency selective surface 25; a resonant cavity may be formed between the first frequency selective surface 4 and the first electrode layer 7; and the liquid crystal molecules 8 may be between the second substrate 2 and the third substrate 3. After the feed source 6 receives the electromagnetic wave signal, the electromagnetic waves may be emitted from the feed source 6 to the first electrode layer 7. Optionally, the first electrode layer 7 may include the second frequency selective surface 25. The second frequency selective surface 25 may have a semi-reflective semi-transparent effect. A part of the electromagnetic waves may be emitted from the surface of the first electrode layer 7 corresponding to the position of the feed source 6, and the other part of the electromagnetic waves may be reflected back to the first frequency selective surface 4. The first frequency selective surface 4 may include the plurality of second electrode blocks 18 having through holes 19. The transmission and reflective coefficient of the first frequency selective surface 4 may be related to the length and width of the second electrode block 18 and the radius r of the through hole 19. The first frequency selective surface 4 may also have reflective effect and may reflect the other part of the electromagnetic waves back to the first electrode layer 7. In such way, the electromagnetic waves may be continuously reflected in the resonant cavity, the electromagnetic waves transmitted through the surface of the upper first electrode layer 7 may be superimposed in phase each time, thereby improving the gain of the antenna 100 and sharpening the beam width. The present disclosure may also include the liquid crystal molecules 8 between the third substrate 3 and the first substrate 1. When a voltage difference is between the first electrode layer 7 and the first frequency selective surface 4 to form an electric field, the liquid crystal molecules 8 may be deflected. Since the deflection degrees of the liquid crystal molecules 8 varies with an applied voltage, the dielectric constant of the liquid crystal molecules 8 between the first electrode layer 7 and the first frequency selective surface 4 may be controlled to be adjusted. In such way, the equivalent dielectric constant of the first frequency selective surface 4 may be controlled to be adjusted, such that the reflective phase φ2 of the first frequency selective surface 4 may be adjusted. The resonance condition is:

$$\frac{4\pi}{\lambda}\cdot h\cdot\cos\,\theta-\Phi1-\Phi2=0$$

where λ is the working wavelength; h is the height of the resonant cavity; θ is the beam pointing; φ1 is the reflective phase of the upper reflective plate; φ2 is the reflective phase of the lower reflective plate. It may be seen that when the height h of the resonant cavity remains unchanged and φ2 is adjustable, resonance adjustment may be satisfied by only adjusting the working wavelength and beam pointing. The working wavelength λ may be adjustable. The working frequency is equal to the reciprocal of the working wavelength, such that the working frequency may be adjustable; and the beam pointing θ may be also adjustable. Therefore, the adjustment of the working frequency and the beam pointing of the antenna 100 may be realized, such that the working mode of the antenna 100 may be no longer fixed with more flexible application.

Figure 6:
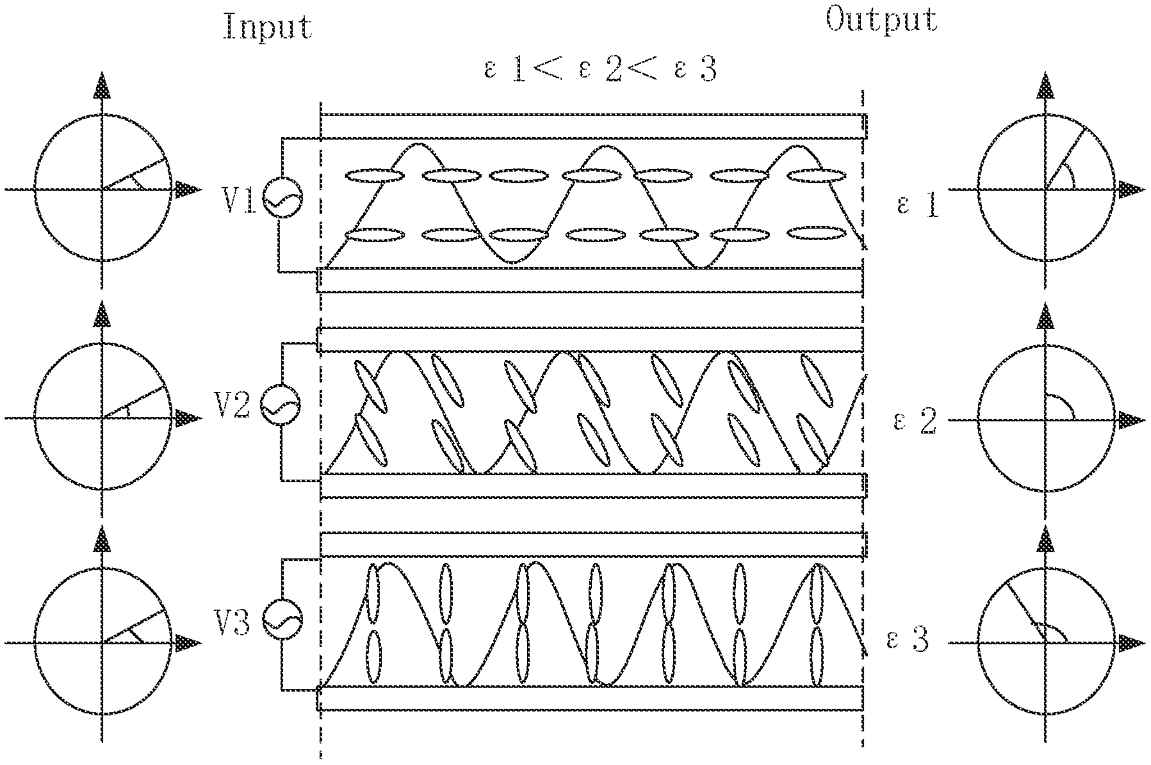
FIG. 6 illustrates a principle schematic of adjusting a reflective phase φ2 of a lower reflective plate after liquid crystal molecules are deflected.

Referring to FIG. 6, FIG. 6 illustrates a principle schematic of adjusting the reflective phase φ2 of the lower reflective plate after the liquid crystal molecules are deflected. It may be seen from FIG. 6 that when same electromagnetic wave is inputted, when different voltages are applied to the electrodes on two sides of the liquid crystal molecules 8, the deflection angles of the liquid crystal molecules 8 are different, and the reflective phases φ2 of the electromagnetic wave may be also different. For example, the greater the applied voltage is, the greater the deflection angle of the liquid crystal molecules 8 is, and the greater the reflective phase φ2 is.

Figure 7:
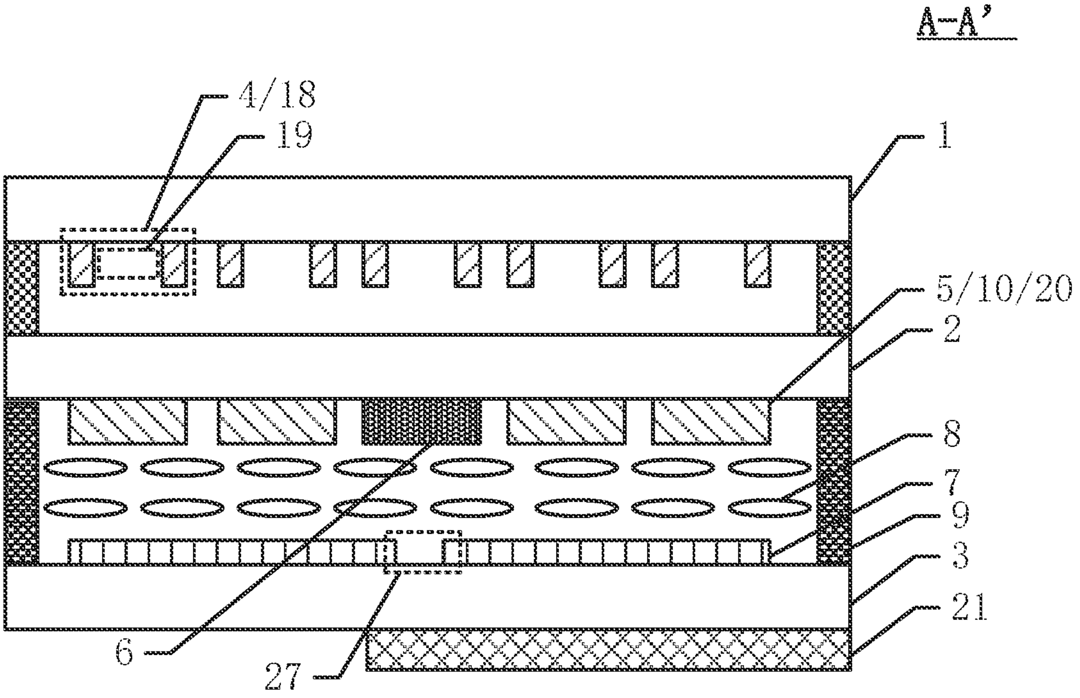
FIG. 7 illustrates another cross-sectional view along an A-A' direction in FIG. 2.
Figure 8:
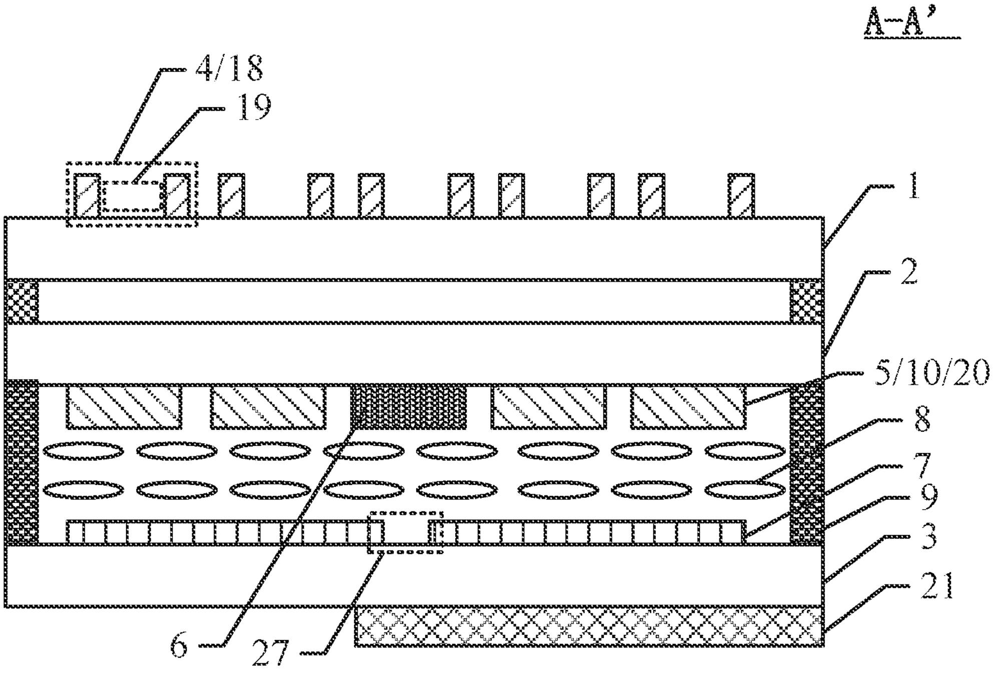
FIG. 8 illustrates another cross-sectional view along an A-A' direction in FIG. 2.
Figure 9:
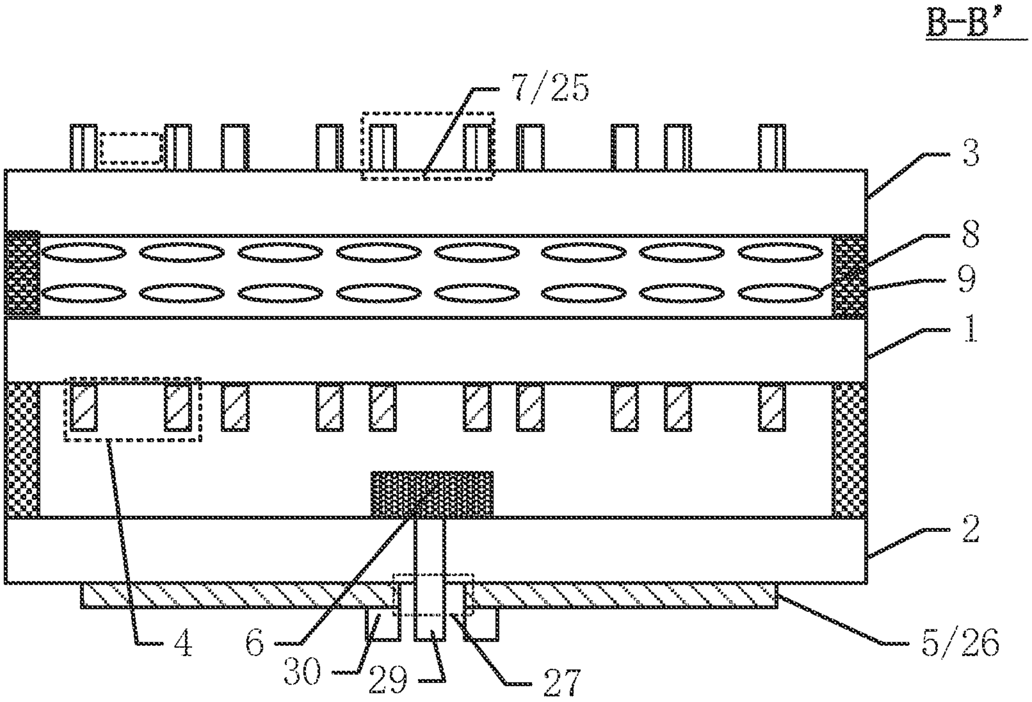
FIG. 9 illustrates another cross-sectional view along a B-B' direction in FIG. 4.

In some optional embodiments, referring to FIGS. 3, 5 and 7-9, FIG. 7 illustrates another cross-sectional view along the A-A' direction in FIG. 2; FIG. 8 illustrates another cross-sectional view along the A-A' direction in FIG. 2; and FIG. 9 illustrates another cross-sectional view along the B-B' direction in FIG. 4. The first frequency selective surface 4 may be on the side of the first substrate 1 adjacent to the second substrate 2, or the first frequency selective surface 4 may be on the side of the first substrate 1 away from the second substrate 2.

The reflective layer 5 may be on the side of the second substrate 2 adjacent to the first substrate 1, or the reflective layer 5 may be on the side of the second substrate 2 away from the first substrate 1.

In FIG. 3, the first frequency selective surface 4 may be on the side of the first substrate 1 adjacent to the second substrate 2. In FIG. 5 the first frequency selective surface 4 may be on the side of the first substrate 1 away from the second substrate 2. In FIG. 7, the first frequency selective surface 4 may be on the side of the first substrate 1 adjacent to the second substrate 2. In FIG. 8, the first frequency selective surface 4 may be on the side of the first substrate 1 away from the second substrate 2. In FIG. 9 the first frequency selective surface 4 may be on the side of the first substrate 1 adjacent to the second substrate 2. The position of the first frequency selective surface 4 may be on the side of the first substrate 1 adjacent to the second substrate 2 or on the side of the first substrate 1 away from the second substrate 2, thereby realizing diversification of the product of the antenna 100.

In FIG. 3, the reflective layer 5 may be on the side of the second substrate 2 adjacent to the first substrate 1. In FIG. 5, the reflective layer 5 may be on the side of the second substrate 2 away from the first substrate 1. In FIG. 7, the reflective layer 5 may be on the side of the second substrate 2 away from the first substrate 1. In FIG. 8, the reflective layer 5 may be on the side of the second substrate 2 away from the first substrate 1. In FIG. 9, the reflective layer 5 may be on the second substrate. 2 away from the side of the first substrate 1. The position of the reflective layer 5 may be on the side of the second substrate 2 adjacent to the first substrate 1 or on the side of the second substrate 2 away from the first substrate 1, thereby realizing diversification of the product of the antenna 100.

Referring to FIG. 3, the first frequency selective surface 4 may be at the side of the first substrate 1 adjacent to the second substrate 2, and the reflective layer 5 may be at the side of the second substrate 2 adjacent to the first substrate 1. No other film layers may be between the first frequency selective surface 4 and the reflective layer 5, thereby being beneficial for reflection of electromagnetic waves between the first frequency selective surface 4 and the reflective layer 5. Referring to FIG. 5, the first frequency selective surface 4 may be on the side of the first substrate 1 away from the second substrate 2, and the reflective layer 5 may be on the side of the second substrate 2 away from the first substrate 1. In one embodiment, the feeding may be realized through a feed connector 28 with high feed efficiency, and the reflective layer 5 may be disposed on the side of the second substrate 2 away from the first substrate 1 to realize grounding. Meanwhile, the first frequency selective surface 4 may be on the side of the first substrate 1 away from the second substrate 2, and the first electrode layer 7 may be on the side of the third substrate 3 adjacent to the first frequency selective surface 4, thereby being beneficial for reflection of electromagnetic waves between the first frequency selective surface 4 and the reflective layer 5. In addition, the liquid crystal molecules 8 may be between the first frequency selective surface 4 and the first electrode layer 8; and the liquid crystal molecules 8 may be directly adjacent to the first frequency selective surface 4 and the first electrode layer 8, which may be beneficial for driving the liquid crystal molecules 8. In FIG. 7, the first frequency selective surface 4 may be on the side of the first substrate 1 adjacent to the second substrate 2, and the reflective layer 5 may be on the side of the second substrate 2 away from the first substrate 1. The reflective layer 5 may be multiplexed as an electrode layer for driving the liquid crystal molecules 8; the reflective layer 5 and the first electrode layer 7 may directly contact the liquid crystal molecules 8; and the reflective layer 5 and the first electrode layer 7 may be simultaneously used as electrodes for driving the liquid crystals. Compared with that the reflective layer 5 and the liquid crystal molecules 8 are separated by the second substrate 2, or the first electrode layer 7 and the liquid crystal molecules 8 are separated by the third substrate 3, the liquid crystal molecules 8 may be easily to be driven. In FIG. 8, the first frequency selective surface 4 may be on the side of the first substrate 1 away from the second substrate 2. There is no barrier of the first substrate 1 when electromagnetic waves radiate to the outside, and the radiation efficiency may be high. In addition, the reflective layer 5 may be on the side of the second substrate 2 away from the first substrate 1. The reflective layer 5 may be multiplexed as an electrode layer for driving liquid crystal molecules 8; the reflective layer 5 and the first electrode layer 7 may directly contact the liquid crystal molecules 8; and the reflective layer 5 and the first electrode layer 7 may be simultaneously used as electrodes for driving liquid crystals. Compared with that the reflective layer 5 and the liquid crystal molecules 8 are separated by the second substrate 2, or the first electrode layer 7 and the liquid crystal molecules 8 are separated by the third substrate 3, the liquid crystal molecules 8 may be easily to be driven. In FIG. 9, the first frequency selective surface 4 may be on the side of the first substrate 1 adjacent to the second substrate 2, and the reflective layer 5 may be on the side of the second substrate 2 away from the first substrate 1. In one embodiment, the feeding may be realized through the feed connector 28 with high feed efficiency. The reflective layer 5 may be disposed on the side of the second substrate 2 away from the first substrate 1 to realize grounding. The first frequency selective surface 4 may be on the side of the first substrate 1 adjacent to the second substrate 2, and the first electrode layer 7 may be on the side of the third substrate 3 away from the first substrate 1. The liquid crystal molecules 8 may be between the first substrate 1 and the third substrate 3, which may be beneficial for forming the liquid crystal cell; and the first electrode layer 7 may be on the side of the third substrate 3 away from the first substrate 1 to improve radiation efficiency.

Figure 10:
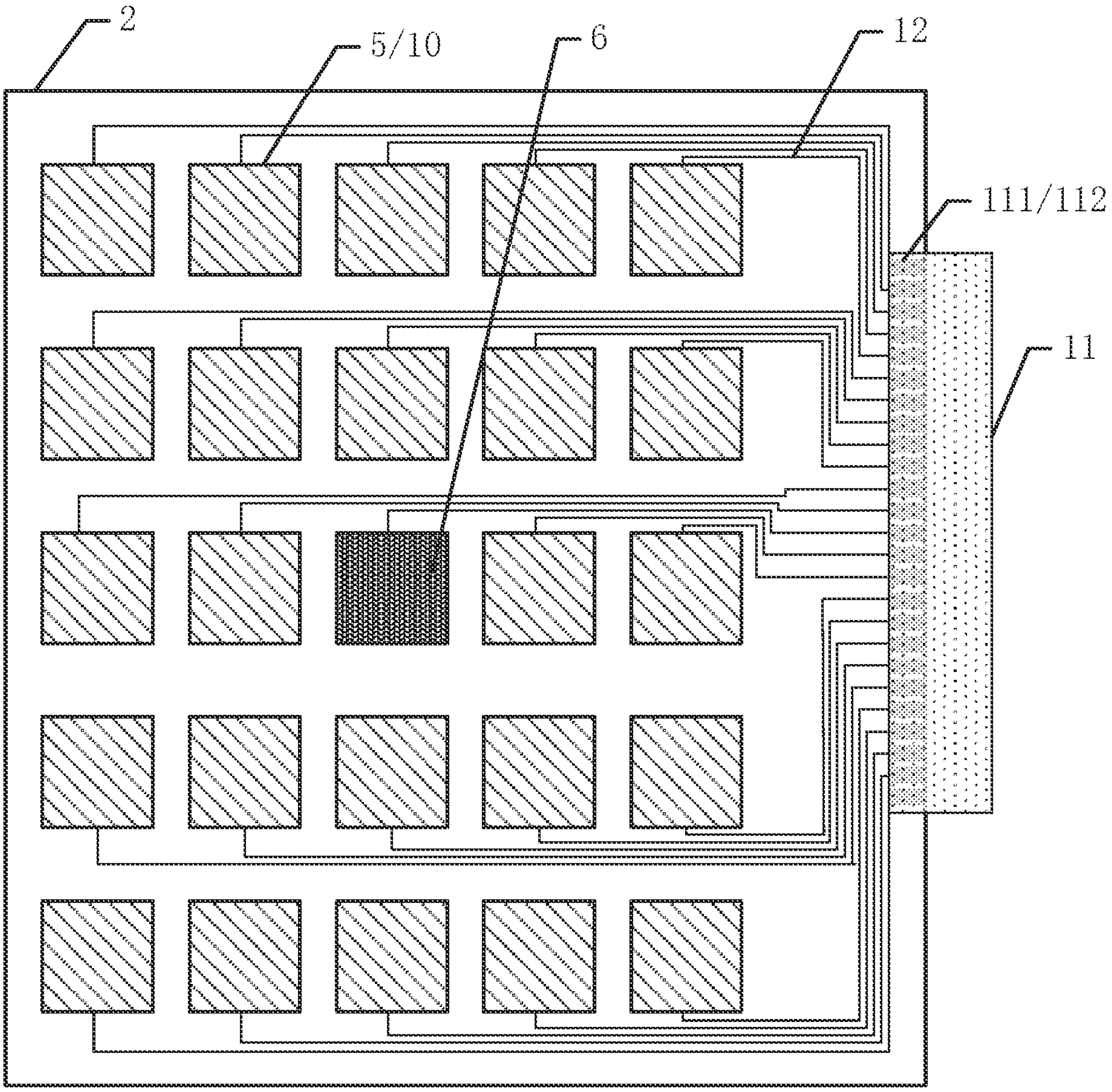
FIG. 10 illustrates a planar structural schematic of a second substrate according to various embodiments of the present disclosure.
Figure 11:
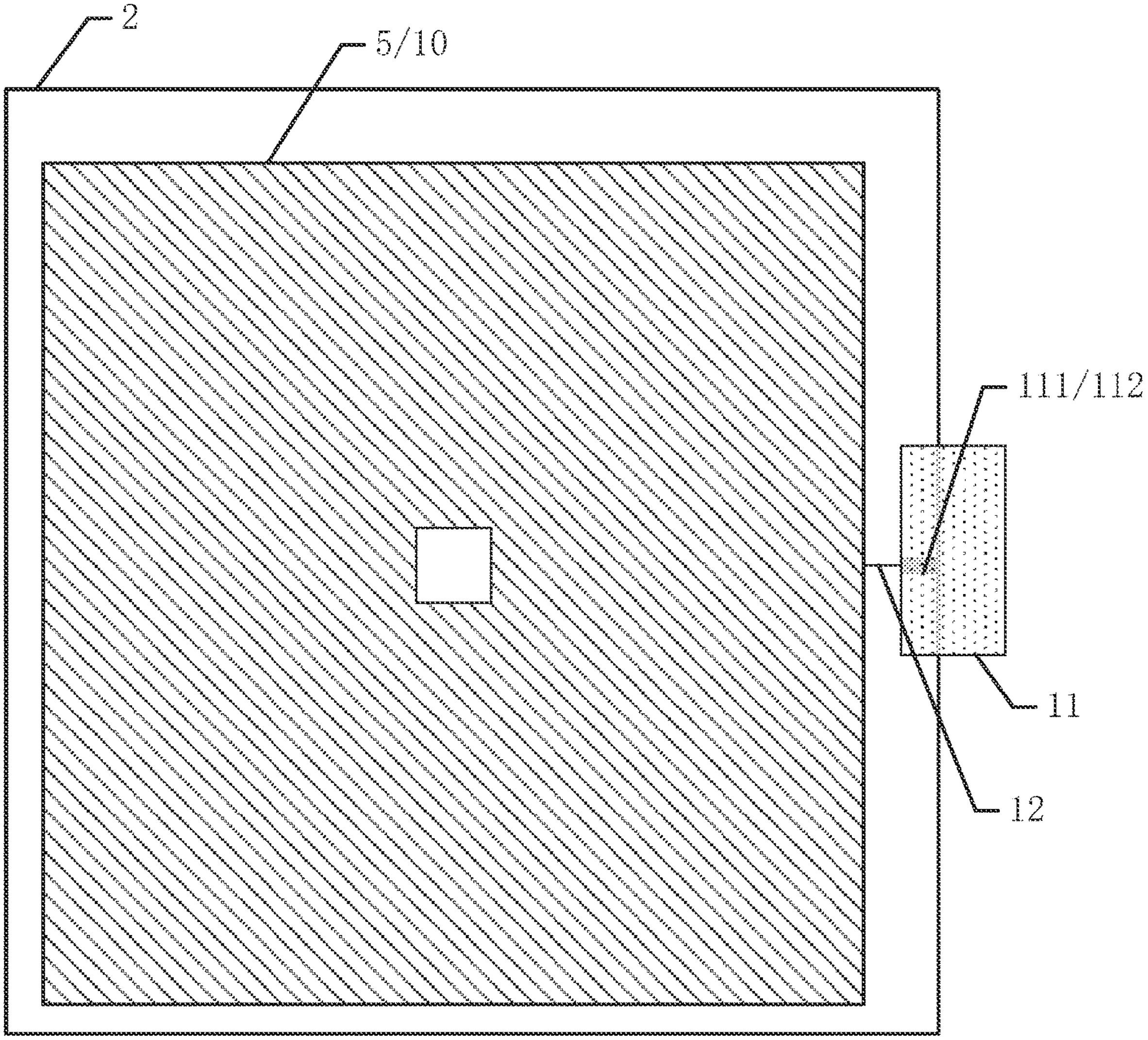
FIG. 11 illustrates another planar structural schematic of a second substrate according to various embodiments of the present disclosure.

In some optional embodiments, referring to FIGS. 10 and 11, FIG. 10 illustrates a planar structural schematic of the second substrate according to various embodiments of the present disclosure; and FIG. 11 illustrates another planar structural schematic of the second substrate according to various embodiments of the present disclosure. A first circuit board 11 may be bound on the side of the second substrate 2, and the reflective layer 5 may be electrically connected to the first circuit board 11 through a first signal line 12.

For example, the second substrate 2 in FIG. 10 may correspond to the antenna 100 in FIG. 2, and the second substrate 2 in FIG. 11 may correspond to the antenna 100 in FIG. 4. It should be noted that in FIG. 4, the signal may be transmitted through a radio frequency connector; and the signal may also be provided through the first circuit board 11 and transmitted to the reflective layer 5 through the first signal line 12.

The first circuit board 11 may be a flexible circuit board. The flexible circuit board may be made of a polyimide or polyester film as a base material with flexibility, which may obviously have the characteristics of high wiring density, light weight, and thin thickness. Optionally, the second substrate 2 may include a first soldering pad 111; the first circuit board 11 may include a second soldering pad 112; and the first circuit board 11 may be bound on the second substrate 2 by anisotropic conductive adhesive.

Optionally, the first circuit board 11 may be on a same layer as the reflective layer 5. For example, if the reflective layer 5 is on the side of the second substrate 2 adjacent to the first substrate 1, the first circuit board 11 may be also on the side of the second substrate 2 adjacent to the first substrate 1; and if the reflective layer 5 is on the side of the second substrate 2 away from the first substrate 1, the first circuit board 11 may be also on the side of the second substrate 2 away from the first substrate 1. In such way, the electrical connection between the reflective layer 5 and the first circuit board 11 may be realized only by disposing the first signal line 12 on the same layer as the reflective layer 5, such that the signal of the first circuit board 11 may be transmitted to the reflective layer 5.

In one embodiment, the first circuit board 11 may be bound on the side of the second substrate 2, the reflective layer 5 may be electrically connected to the first circuit board 11 through the first signal line 12, and the first circuit board 11 may transmit the signal to the reflective layer 5 through the first signal line 12 to realize signal transmission.

In some optional embodiments, referring to FIGS. 10 and 11, the reflective layer 5 may include first electrode blocks 10, a gap may be between adjacent first electrode blocks 10, the first electrode blocks 10 may be electrically connected to soldering pads of the first circuit board 11 in one-to-one correspondence through the first signal lines 12.

In FIG. 10, the reflective layer 5 may include a plurality of first electrode blocks 10 arranged in an array. Optionally, the material of the first electrode block 10 may be metal, as long as the first electrode block can play a reflective role. For example, the first electrode block may be made of copper. Obviously, the material of the reflective layer 5 may not be limited herein. Gaps may be between the first electrode blocks 10 arranged in an array. The gap may ensure that the first electrode blocks 10 are insulated from each other. The first electrode block 10 may be electrically connected to the first circuit board 11 through the first signal line 12. In such way, a bias voltage may be inputted to each first electrode block 10. It may be seen from FIG. 3 that the voltage between the first electrode block 10 and the reflective layer 5 may drive the liquid crystal molecules 8 to be deflected. Different positions of the first electrode blocks 10 may input different bias voltages to the first electrode blocks 10, such that the deflection angles of the liquid crystal molecules 8 may be also different. Meanwhile, the first electrode block 10 may be used as the lower reflective layer 5 of the resonant cavity, which may reflect electromagnetic waves. The permittivity of the first electrode block 10 may be also different, such that the reflective phase $\varphi 2$ may be adjusted. Resonance adjustment may be satisfied by only adjusting the working wavelength and beam pointing. The working wavelength $\lambda$ may be adjustable. The working frequency is equal to the reciprocal of the working wavelength, such that the working frequency may be adjustable; and the beam pointing $\theta$ may be also adjustable. Therefore, the adjustment of the working frequency and the beam pointing of the antenna 100 may be realized, such that the working mode of the antenna 100 may be no longer fixed with more flexible application.

In FIG. 11, the reflective layer 5 may be disposed as an entire layer; and at this point, the number of first electrode blocks 10 may be only one. Referring to FIGS. 4 and 5, a hollow may be formed at the position corresponding to the feed source 6; and the first electrode block 10 of the reflective layer 5 may be electrically connected to the first circuit board 11 through the first signal line 12 to transmit the signal to the reflective layer 5.

Figure 12:
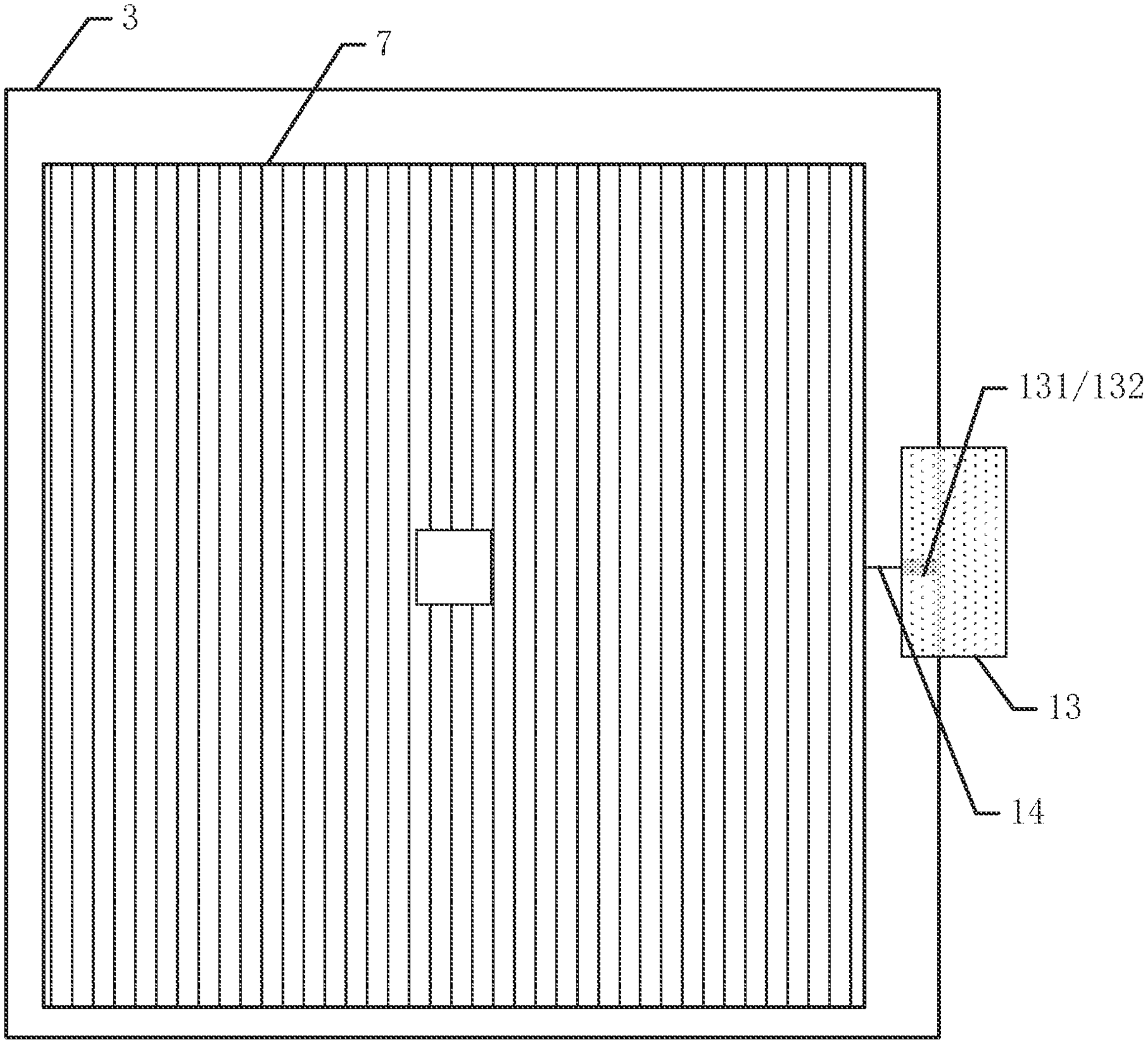
FIG. 12 illustrates a planar structural schematic of a third substrate according to various embodiments of the present disclosure.
Figure 13:
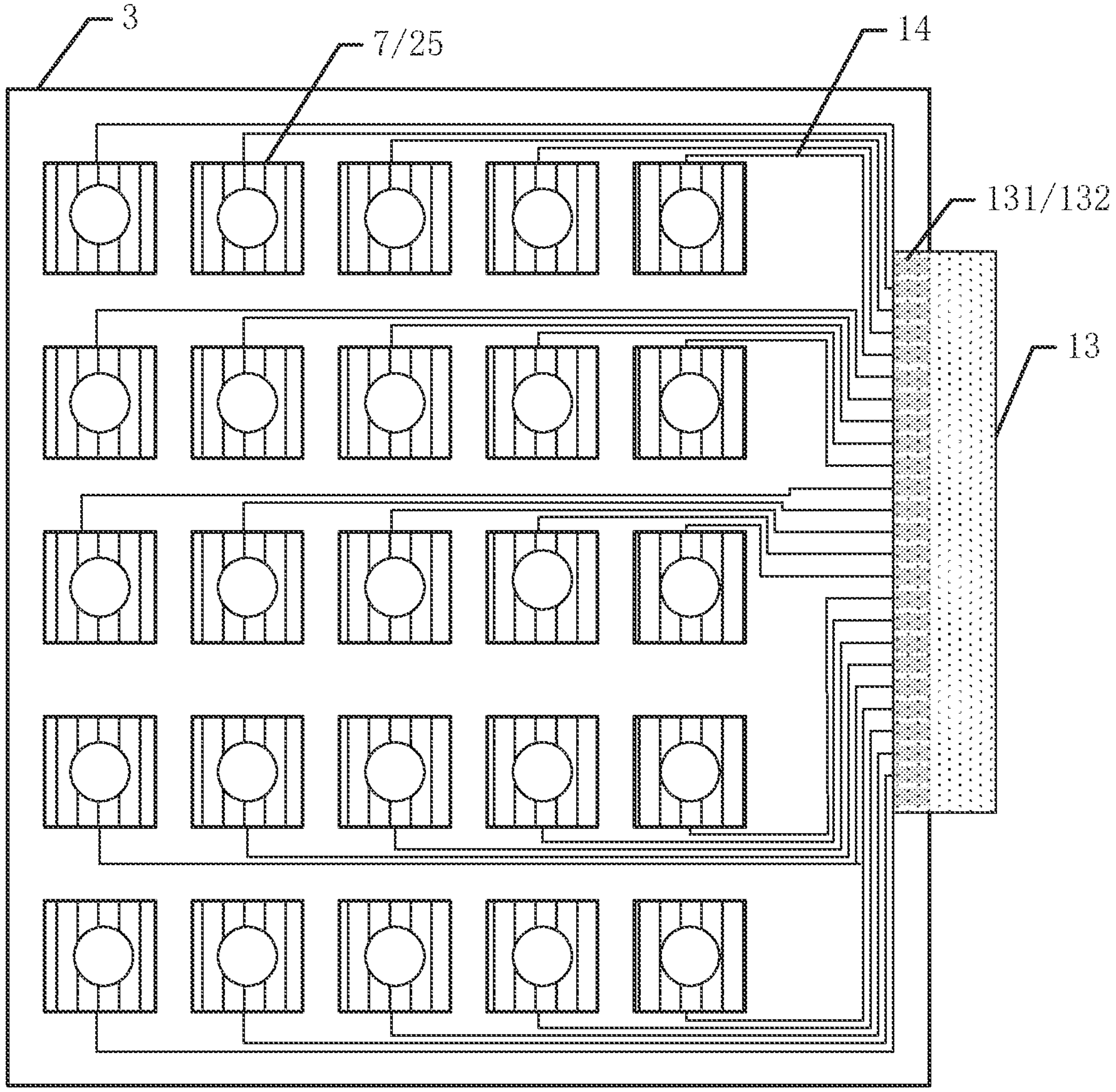
FIG. 13 illustrates another planar structural schematic of a third substrate according to various embodiments of the present disclosure.

In some optional embodiments, referring to FIGS. 12 and 13, FIG. 12 illustrates a planar structural schematic of the third substrate according to various embodiments of the present disclosure; and FIG. 13 illustrates another planar structural schematic of the third substrate according to various embodiments of the present disclosure. A second circuit board 13 may be bound on the side of the third substrate 3, and the first electrode layer 7 may be electrically connected to a third soldering pad of a plurality of third soldering pads in the second circuit board 13 through the second signal line 14 in one-to-one correspondence.

The third substrate 3 in FIG. 12 may correspond to the antenna 100 in FIG. 2. Optionally, the third substrate 3 may include third soldering pads 131; the second circuit board 13 may include fourth soldering pads 132; and the second circuit board 13 may be bound on the third substrate 3 by anisotropic conductive adhesive. Optionally, the first electrode layer 7 in FIG. 12 may be disposed as an entire layer. Referring to FIGS. 2 and 3, a hollow may be formed at the position corresponding to the feed source 6; the first electrode layer 7 and the second circuit board 13 may be electrically connected through the second signal line 14; and the signal, optionally, a ground signal, may be transmitted to the first electrode layer 7.

The third substrate 3 in FIG. 13 may correspond to the antenna 100 in FIG. 4, and the first electrode layer 7 in FIG.

13 may include a plurality of second frequency selective surfaces 25. Optionally, the second frequency selective surface 25 may be made of a same material as the first frequency selective surface 4, which may not be limited herein. A plurality of second frequency selective surfaces 25 may be arranged in an array, and the first electrode layer 7 may be electrically connected to a third soldering pad of a plurality of third soldering pads in the second circuit board 13 through the second signal line 14 in one-to-one correspondence. It may be seen from FIGS. 4 and 5 that at this point, the second circuit board 13 can transmit the bias voltage signal to the first electrode layer 7 through the second signal line 14, such that the voltage difference between the first electrode layer 7 and the first frequency selective surface 4 may form an electric field that drives the deflection of the liquid crystal molecules 8. It should be noted that the frequency of the bias voltage is low, and the frequency of the electromagnetic wave is high, such that the bias voltage and the electromagnetic wave may not affect each other. Therefore, the process of transmitting the bias voltage to the first frequency selective surface 4 or to the second frequency selective surface 25 may not affect the transmission of high-frequency electromagnetic waves.

In one embodiment, the second circuit board 13 may be bound to the side of the third substrate 3; the first electrode layer 7 may be electrically connected to the second circuit board 13 through the second signal line 14 in one-to-one correspondence; and the second circuit board 13 may transmit the signal to the first electrode layer 7 through the second signal line 14 to realize signal transmission.

Figure 14:
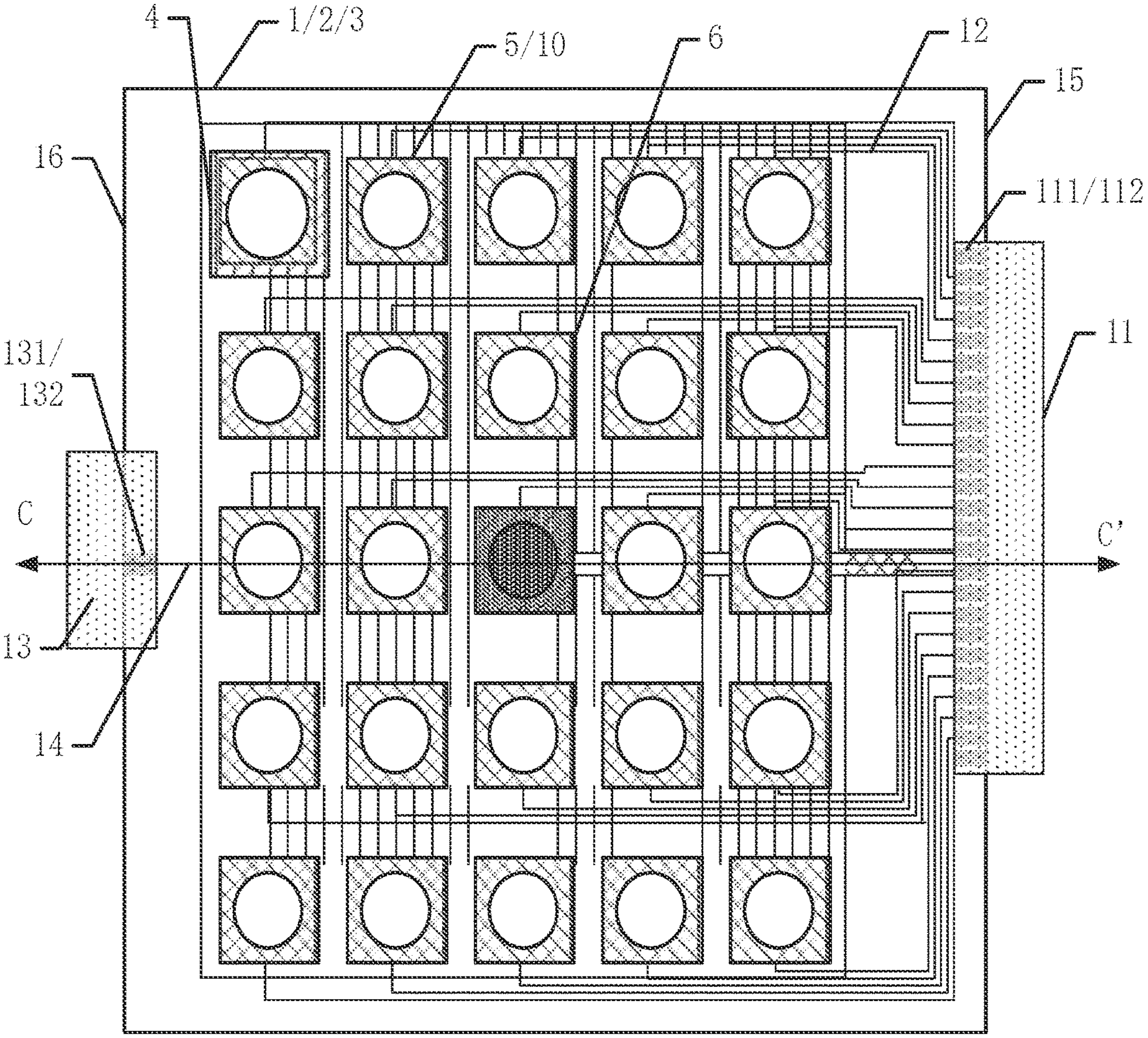
FIG. 14 illustrates another planar structural schematic of an antenna according to various embodiments of the present disclosure.
Figure 15:
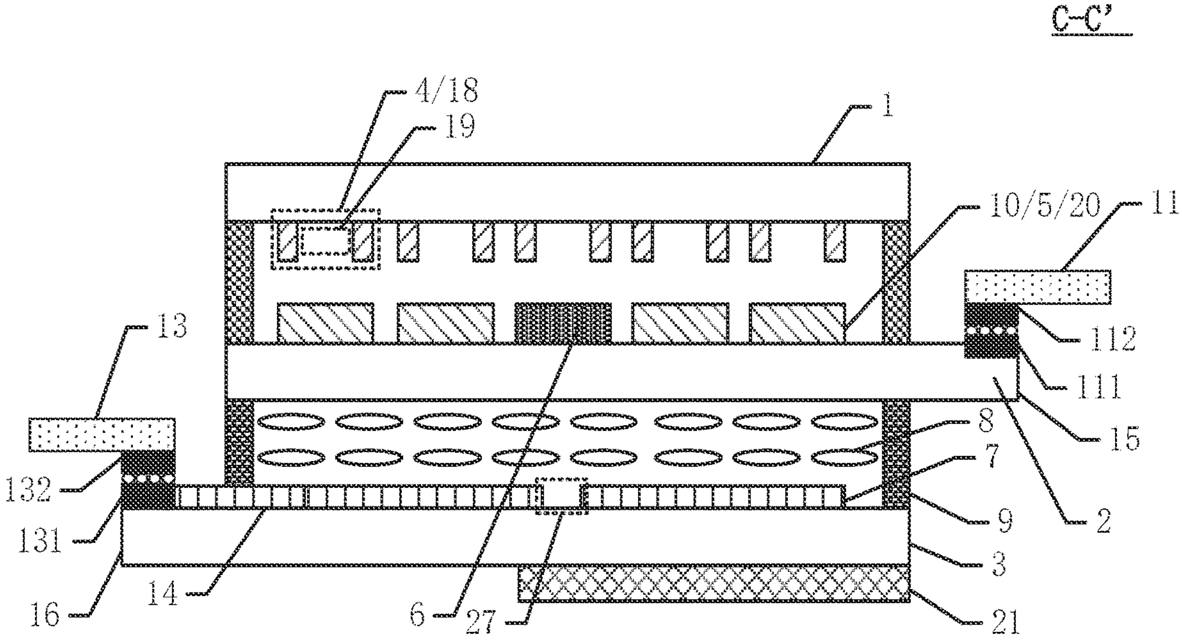
FIG. 15 illustrates a cross-sectional view along a C-C' direction in FIG. 14.
Figure 16:
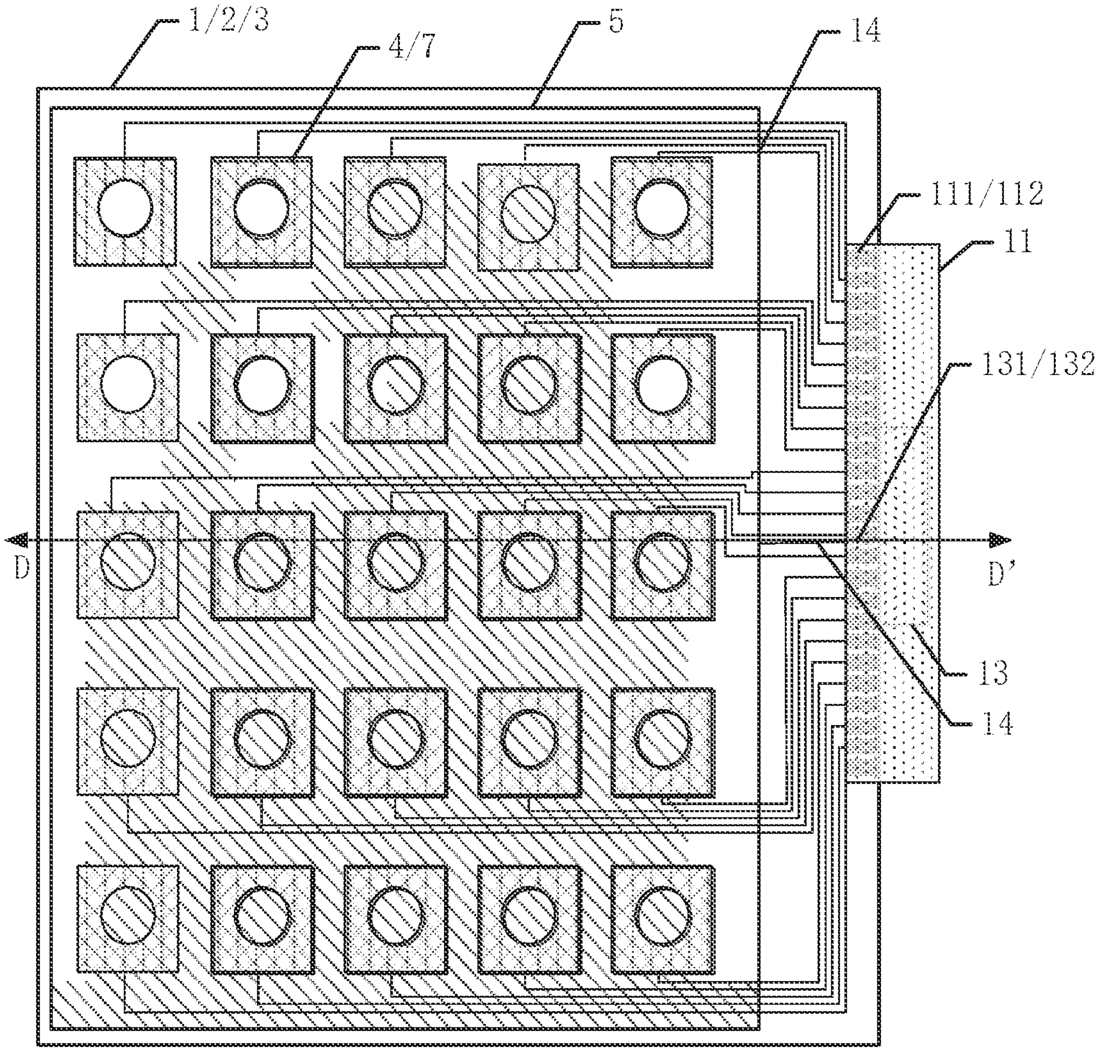
FIG. 16 illustrates another planar structural schematic of an antenna according to various embodiments of the present disclosure.
Figure 17:
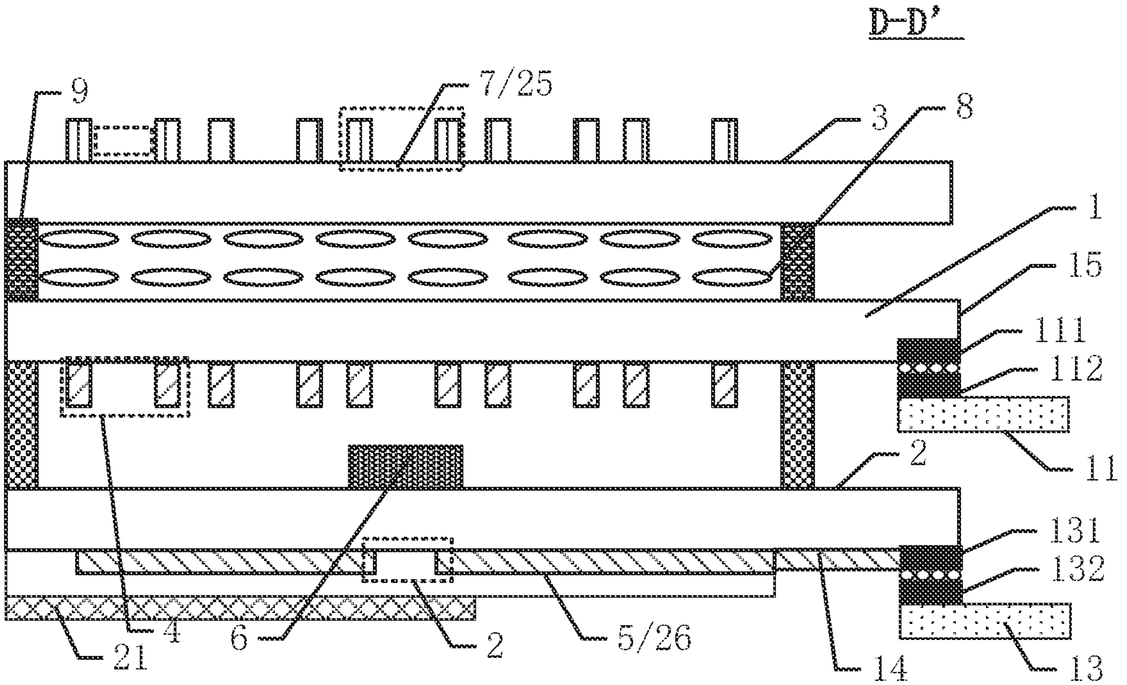
FIG. 17 illustrates a cross-sectional view along a D-D' direction in FIG. 16.

In some optional embodiments, referring to FIGS. 14-17, FIG. 14 illustrates another planar structural schematic of the antenna according to various embodiments of the present disclosure; FIG. 15 illustrates a cross-sectional view along a C-C' direction in FIG. 14; FIG. 16 illustrates another planar structural schematic of the antenna according to various embodiments of the present disclosure; and FIG. 17 illustrates a cross-sectional view along a D-D' direction in FIG. 16. The antenna 100 may include a first edge 15 and a second edge 16 which are opposite along a first direction; and the first direction may be in parallel with the plane where the first substrate 1 is located.

The first circuit board 11 may be on the side of the second substrate 2 adjacent to the first edge 15, and the second circuit board 13 may be on the side of the third substrate 3 adjacent to the second edge 16; or the first circuit board 11 may be on the side of the second substrate 2 adjacent to the second edge 16, and the second circuit board 13 may be on the side of the third substrate 3 adjacent to the first edge 15; or the first circuit board 11 may be on the side of the second substrate 2 adjacent to the first edge 15, and the second circuit board 13 may be on the side of the third substrate 3 adjacent to the first edge 15; or the first circuit board 11 may be on the side of the second substrate 2 adjacent to the second edge 16, and the second circuit board 13 may be on the side of the third substrate 3 adjacent to the second edge 16.

For example, the first circuit board 11 and the second circuit board 13 may be on a same side of the antenna 100 or on different sides of the antenna 100. When on the same side of the antenna 100, the first circuit board 11 and the second circuit board 13 may both be located at the first edge 15, or the first circuit board 11 and the second circuit board 13 may both be located at the second edge 16. When the first circuit board 11 and the second circuit board 13 are on different sides of the antenna 100, the first circuit board 11 may be located at the first edge 15 and the second circuit board 13 may be located at the second edge 16; or the first circuit board 11 may be located at the second edge 16 and the second circuit board 13 may be located at the first edge 15. In FIGS. 14 and 15, the first circuit board 11 may be on the second substrate 2 adjacent to the first edge 15 and the second circuit board 13 may be on the third substrate 3 adjacent to the second edge 16 merely as an example for illustration. When the first circuit board 11 and the second circuit board 13 are on different sides, that is, the first circuit board 11 and the second circuit board 13 are on the first edge 15 and the second edge 16 respectively, there is no overlapping between the first circuit board 11 and the second circuit board 13 along the direction perpendicular to the plane where the first substrate 1 is located, such that the first circuit board 11 and the second circuit board 13 may not affect each other due to the heat generated during the binding process when the first circuit board 11 and the second circuit board 13 are bound with each other. In FIGS. 16 and 17, the first circuit board 11 and the second circuit board 13 may be located at the first edge 15 merely as an example for illustration. In addition, the first circuit board 11 may be on the side of the first substrate 1 adjacent to the first edge 15, and the second circuit board 13 may be on the side of the second substrate 2 adjacent to the first edge 15. At this point, since the first circuit board 11 and the second circuit board 13 are on a same side, there is no need to reserve a stepped region on the opposite side edge (that is, the second edge 16 in FIGS. 16 and 17) to dispose the circuit board. Therefore, the width of the frame region of the antenna 100 may be reduced, which may be beneficial for increasing the effective use region of the antenna 100.

The first circuit board 11 may be on the side of the second substrate 2 adjacent to the first edge 15, and the second circuit board 13 may be on the side of the third substrate 3 adjacent to the second edge 16; or the first circuit board 11 may be on the side of the second substrate 2 adjacent to the second edge 16, and the second circuit board 13 may be on the side of the third substrate 3 adjacent to the first edge 15. Since there is no overlapping between the first circuit board 11 and the second circuit board 13 along the direction perpendicular to the plane where the first substrate 1 is located, the first circuit board 11 and the second circuit board 13 may not affect each other due to the heat generated during the binding process when the first circuit board 11 and the second circuit board 13 are bound with each other.

The first circuit board 11 may be on the side of the second substrate 2 adjacent to the first edge 15, and the second circuit board 13 may be on the side of the third substrate 3 adjacent to the first edge 15; or the first circuit board 11 may be on the side of the second substrate 2 adjacent to the second edge 16, and the second circuit board 13 may be on the side of the third substrate 3 adjacent to the second edge 16. Since the first circuit board 11 and the second circuit board 13 are on a same side, there is no need to reserve a stepped region at the opposite side edge to dispose the circuit board. Therefore, the width of the frame region of the antenna 100 may be reduced, which may be beneficial for increasing the effective use region of the antenna 100.

In addition, since the arrangement positions of the first circuit board 11 and the second circuit board 13 are different, the structure of the antenna 100 may be diversified.

Furthermore, it should be noted that the second signal line 14 may be made of a same material and a same film layer as the reflective layer 5. Obviously, if the second signal line 14 and the reflective layer 5 are at different layers, the second signal line 14 and the reflective layer 5 may be electrically connected to each other by means of via holes.

In some optional embodiments, referring to FIG. 3, a support column 17 may be between the first substrate 1 and the second substrate 2; and an accommodation space may be formed between the first substrate 1, the second substrate 2 and the support column 17.

As mentioned above, the first distance h may be the minimum distance between the first frequency selective surface 4 and the reflective layer 5. The support column 17 may be between the first substrate 1 and the second substrate 2. The support column 17 may be used to support the distance between the first substrate 1 and the second substrate 2 to form a resonant cavity, and electromagnetic waves may be continuously reflected between the first frequency selective surface 4 and the reflective layer 5. Obviously, the electromagnetic waves transmitted through the first frequency selective surface 4 on the upper layer each time may be superimposed in phase, thereby increasing the gain of the antenna 100 and sharpening the beam width. After the support column 17 support the first substrate 1 and the second substrate 2, a reflective path of the electromagnetic waves may be formed.

In some optional embodiments, referring to FIGS. 2-5, the first frequency selective surface 4 may include the plurality of second electrode blocks 18; a gap may be between adjacent second electrode blocks 18; and the second electrode block 18 may include the through hole 19 passing through the second electrode block 18.

Optionally, the first frequency selective surface 4 may be a patch type or a groove type. In one embodiment, the first frequency selective surface 4 may be a groove-type frequency selective surface merely as an example for illustration, that is, the second electrode block 18 may include the through hole 19 passing through the second electrode block 18. Obviously, a distance may be between the second electrode blocks 18. The groove-type frequency selective surface may be a band-pass frequency selective surface with high transmittance, which may improve the transmission rate of electromagnetic waves and also reflect electromagnetic waves back to the reflective layer 5.

In some optional embodiments, referring to FIGS. 2 and 3, the third substrate 3 may be on the side of the second substrate 2 away from the first substrate 1, and the reflective layer 5 may include an electromagnetic band-gap structure 20.

For example, the function of the reflective layer 5 may be to reflect the electromagnetic waves, reflected by the first frequency selective surface 4 to the reflective layer 5, back to the first frequency selective surface 4. In one embodiment, the reflective layer 5 may use electromagnetic band-gap structure 20. The electromagnetic band-gap structure 20 may have the effect of reflecting electromagnetic waves and also suppressing surface waves. The surface wave may be the electromagnetic wave that is transmitted on the surface of the reflective layer 5 and cannot return to the first frequency selective surface 4. Therefore, when the electromagnetic waves are reflected from the first frequency selective surface 4 to the electromagnetic band-gap structure 20, the electromagnetic waves may be suppressed from propagating on the surface of the electromagnetic band-gap structure 20 and the number of electromagnetic waves returning to the first frequency selective surface 4 may be reduced. In such way, the number of electromagnetic waves returning to the first frequency selective surface 4 may be increased to achieve high gain.

In some optional embodiments, referring to FIGS. 2 and 3, the first electrode layer 7 may include the feed hole 27; the side of the third substrate 3 away from the second substrate 2 may include a microstrip line 21; and along the direction perpendicular to the plane where the first substrate 1 is located, the feed source 6, the feed hole 27 and the microstrip line 21 may be at least partially overlapped with each other.

In FIGS. 2 and 3, the electromagnetic wave may be coupled to the feed source 6 through the microstrip line 21. Herein, the feed hole 27 may be formed on the first electrode layer 7, which may reduce the interference of the first electrode layer 7 to the electromagnetic wave and improve feed efficiency. Along the direction perpendicular to the plane where the first substrate 1 is located, the feed source 6, the feed hole 27 and the microstrip line 21 may be at least partially overlapped with each other, and the electromagnetic wave may be transmitted through the coupling feed mode of the microstrip line 21, which may be simple in process and low in cost.

In some optional embodiments, referring to FIGS. 2, 3, 7 and 18, FIG. 18 illustrates another cross-sectional view along the A-A' direction in FIG. 2. The feed source 6 may be on the side of the second substrate 2 adjacent to the first substrate 1; or the feed source 6 may be on the side of the second substrate 2 away from the first substrate 1.

In FIG. 3, the feed source 6 may be on the side of the second substrate 2 adjacent to the first substrate 1. In such way, after the feed source 6 receives the electromagnetic wave signal transmitted by the microstrip line 21, the distance between the feed source 6 and the first frequency selective surface 4 may be relatively close, which may be more beneficial for outward radiation of electromagnetic waves to the first frequency selective surface 4, thereby improving radiation efficiency.

Figure 18:
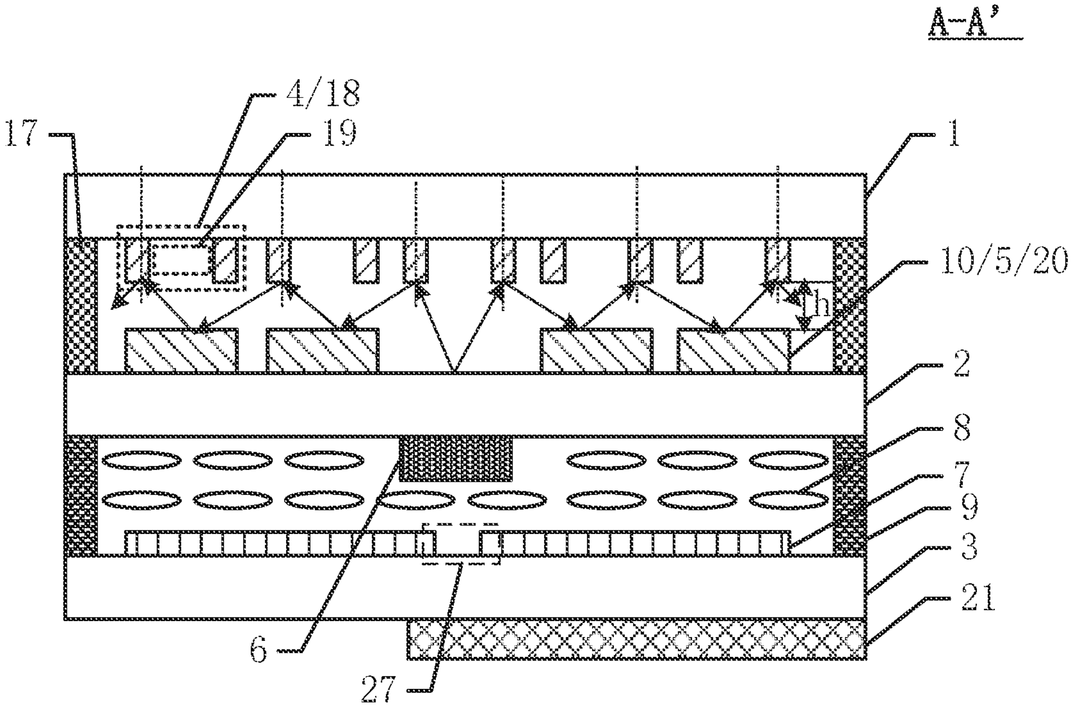
FIG. 18 illustrates another cross-sectional view along an A-A' direction in FIG. 2.

In FIGS. 7 and 18, the feed source 6 may be on the side of the second substrate 2 away from the first substrate 1, and the distance between the feed source 6 and the microstrip line 21 may be reduced, thereby improving coupling feed efficiency.

In some optional embodiments, referring to FIGS. 2 and 3, the reflective layer 5 may include the plurality of first electrode blocks 10, the first frequency selective surface 4 may include the plurality of second electrode blocks 18, and along the direction perpendicular to the plane where the first substrate 1 is located, the first electrode blocks 10 and the second electrode blocks 18 may be at least partially overlapped with each other.

The shape of the orthographic projection of the first electrode block 10 and/or the second electrode block 18 on the plane of the first substrate 1 may be a polygon, a circle, a rhombus or an ellipse.

For example, in one embodiment, the first electrode blocks 10 and the second electrode blocks 18 may be at least partially overlapped with each other along the direction perpendicular to the plane where the first substrate 1 is located, which may be merely used as an example for illustration. It may be understood that, along the direction perpendicular to the plane where the first substrate 1 is located, the first electrode block 10 may be inside the second electrode block 18, which may not be limited herein. Along the direction perpendicular to the plane where the first substrate 1 is located, the first electrode block 10 and the second electrode block 18 may be at least partially overlapped with each other, which can ensure that the electromagnetic waves reflected back from the second electrode block 18 of the first frequency selective surface 4 may be received and reflected by the first electrode block 10 in the reflective layer 5, thereby realizing high gain.

In FIGS. 2 and 3, the orthographic projection shape of the first electrode block 10 and the second electrode block 18 on the plane where the first substrate 1 is located may be a square merely as an example for illustration. Obviously, the orthographic projection shape may also be a pentagon, a hexagon, a circle, a rhombus, an ellipse or the like. The shapes of the orthographic projections of the first electrode block 10 and the second electrode block 18 on the plane where the first substrate 1 is located may be diversified, as long as it ensures that the electromagnetic waves are reflected multiple times between the first electrode block 10 and the second electrode block 18.

In some optional embodiments, referring to FIGS. 3 and 5, the third substrate 3 may be on the side of the second substrate 2 away from the first substrate 1, and a first closed space 23 may be formed between the third substrate 3 and the second substrate 2 through the first frame adhesive 9 to accommodate the liquid crystal molecules 8; or the third substrate 3 may be on the side of the first substrate 1 away from the second substrate 2, and a first closed space 23 may be formed between the third substrate 3 and the first substrate 1 through the first frame adhesive 9 to accommodate the liquid crystal molecules 8.

For example, in FIG. 3, the third substrate 3 may be on the side of the second substrate 2 away from the first substrate 1; the liquid crystal molecules 8 may be between the second substrate 2 and the third substrate 3; and the second substrate 2 and the third substrate 3 may form the airtight first closed space 23 through the first frame adhesive 9 to accommodate the liquid crystal molecules 8 to form a liquid crystal cell. Obviously, the configuration of the first frame adhesive 9 may also prevent the problem of liquid crystal leakage.

In FIG. 5, the third substrate 3 may be on the side of the first substrate 1 away from the second substrate 2; the liquid crystal molecules 8 may be between the third substrate 3 and the first substrate 1; and the third substrate 3 and the first substrate 1 may form the airtight first closed space 23 through the first frame adhesive 9 to accommodate the liquid crystal molecules 8 to form a liquid crystal cell. Obviously, the configuration of the first frame adhesive 9 may also prevent the problem of liquid crystal leakage.

Figure 19:
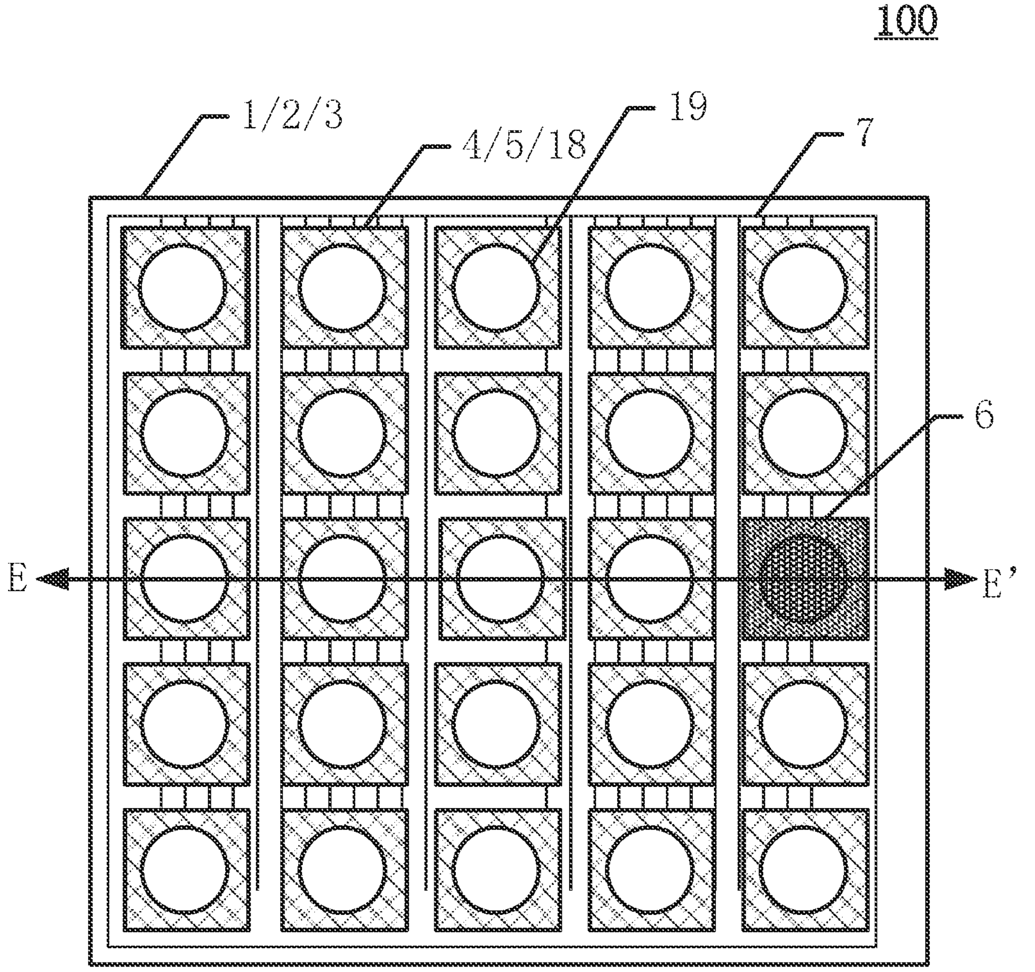
FIG. 19 illustrates another planar structural schematic of an antenna according to various embodiments of the present disclosure.
Figure 20:
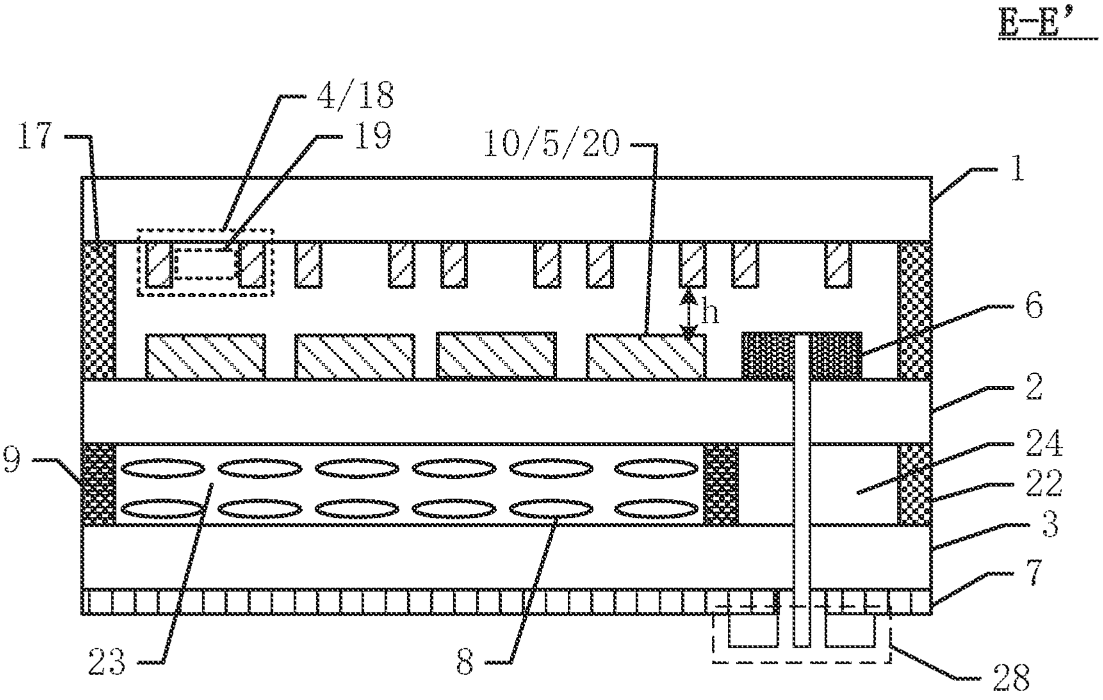
FIG. 20 illustrates a cross-sectional view along an E-E' direction in FIG. 19.

In some optional embodiments, referring to FIGS. 19 and 20, FIG. 19 illustrates another planar structural schematic of the antenna according to various embodiments of the present disclosure; and FIG. 20 illustrates a cross-sectional view along an E-E' direction in FIG. 19. The third substrate 3 may be on the side of the second substrate 2 away from the first substrate 1, a second space 24 may be formed between the third substrate 3 and the second substrate 2 through the support part 22, and along the direction perpendicular to the plane where the first substrate 1 is located, the feed source 6 may be overlapped with the second space 24.

Optionally, the support part 22 may be formed of a frame adhesive material or may be the support column 17; and the material of the support part 22 may not be limited herein.

In FIG. 20, the first frequency selective surface 4 may be on the side of the first substrate 1 adjacent to the second substrate 2, and the reflective layer 5 may be on the side of the second substrate 2 adjacent to the first substrate 1, which may merely be used as an example for illustration. Obviously, the first frequency selective surface 4 may also be on the side of the first substrate 1 away from the second substrate 2, and the reflective layer 5 may also be on the side of the second substrate 2 away from the first substrate 1, which may not be limited herein.

In one embodiment, the third substrate 3 may be on the side of the second substrate 2 away from the first substrate 1, the liquid crystal molecules 8 may be between the second substrate 2 and the third substrate 3, and the first closed space 23 may be formed between the second substrate 2 and the third substrate 3 through the first frame adhesive 9 to accommodate the liquid crystal molecules 8. In addition, the second space 24 may be also formed between the second substrate 2 and the third substrate 3, no liquid crystal molecule 8 may be in the second space 24, and along the direction perpendicular to the plane where the first substrate 1 is located, the feed source 6 may be overlapped with the second space 24. In FIGS. 19 and 20, the second space 24 may be on the side of the antenna 100 as an example for illustration. Obviously, the second space 24 may also be in the middle of the antenna 100, which may not be limited herein. The second space 24 opposite to the feed source 6 may be a micron-scale air cavity.

It may be understood that no liquid crystal molecules 8 may be in the second space 24. At this point, the feed connector 28 may be disposed on the side of the third substrate 3 away from the second substrate 2, such that the feed connector 28 may be electrically connected to the feed source 6 to realize direct feed; and such feed manner may improve feed efficiency.

In one embodiment, since the feed source 6 is on the side of the antenna 100, when multiple antennas 100 are spliced to form an antenna group 200, splicing may be more convenient, and higher aperture and aperture efficiency may be achieved.

In some optional embodiments, referring to FIGS. 19 and 20, the side of the third substrate 3 away from the second substrate 2 may include the first electrode layer 7; and the feed connector 28 may pass through the first electrode layer 7, the third substrate 3 and the second substrate 2 sequentially to be coupled with the feed source 6.

The feed connector 28 may be on the side of the first electrode layer 7 away from the first substrate 1 and electrically connected to the feed source 6. The direct electrical connection between the feed connector 28 and the feed source 6 may improve feed efficiency.

FIG. 20 shows that the feed source 6 may be on the side of the second substrate 2 adjacent to the first substrate 1. The feed connector 28 may be electrically connected to the feed source 6 by passing through the first electrode layer 7, the third substrate 3 and the second substrate 2 sequentially.

Figure 21:
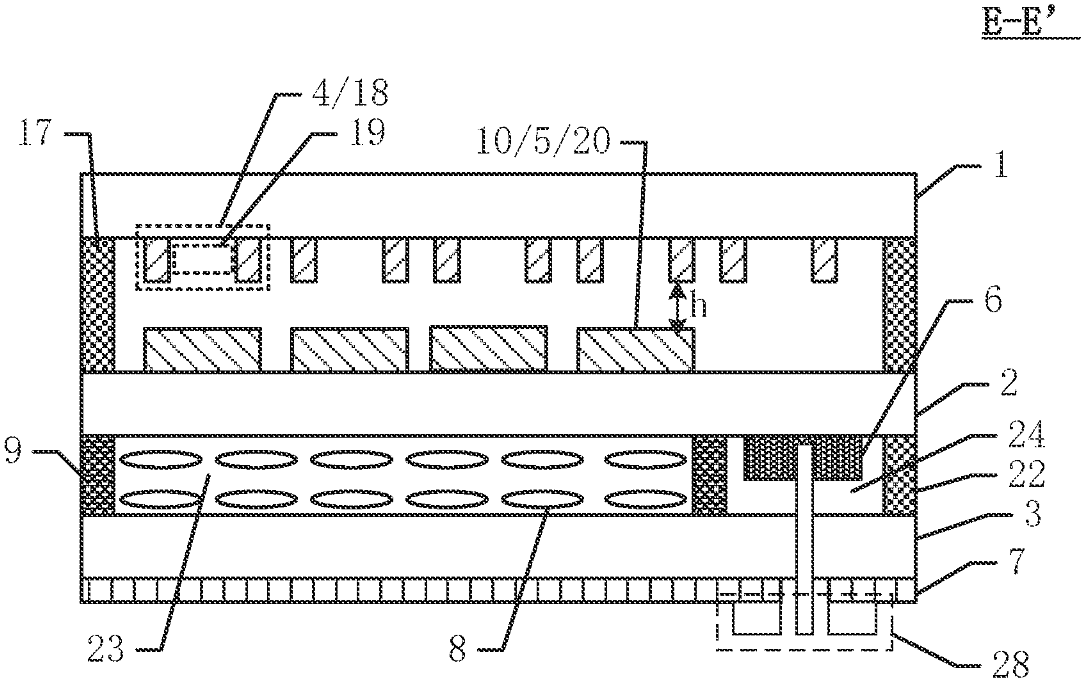
FIG. 21 illustrates another cross-sectional view along an E-E' direction in FIG. 19.

In some optional embodiments, referring to FIG. 21, FIG. 21 illustrates another cross-sectional view along the E-E' direction in FIG. 19. In FIG. 21, the feed source 6 may be on the side of the second substrate 2 away from the first substrate 1. The feed connector 28 may be electrically connected to the feed source 6 by only passing through the first electrode layer 7 and the third substrate 3, and holes may only need to be punched in the first electrode layer 7 and the third substrate 3.

Figure 22:
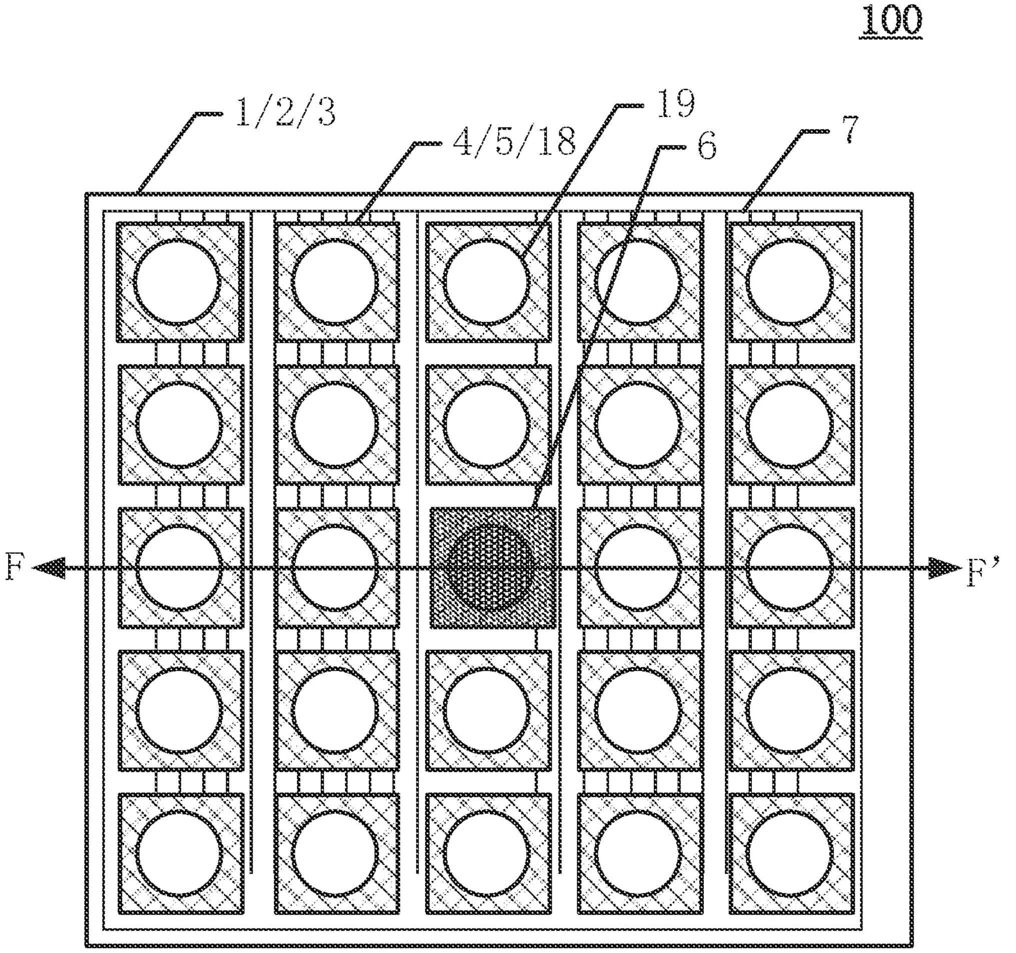
FIG. 22 illustrates another planar structural schematic of an antenna according to various embodiments of the present disclosure.
Figure 23:
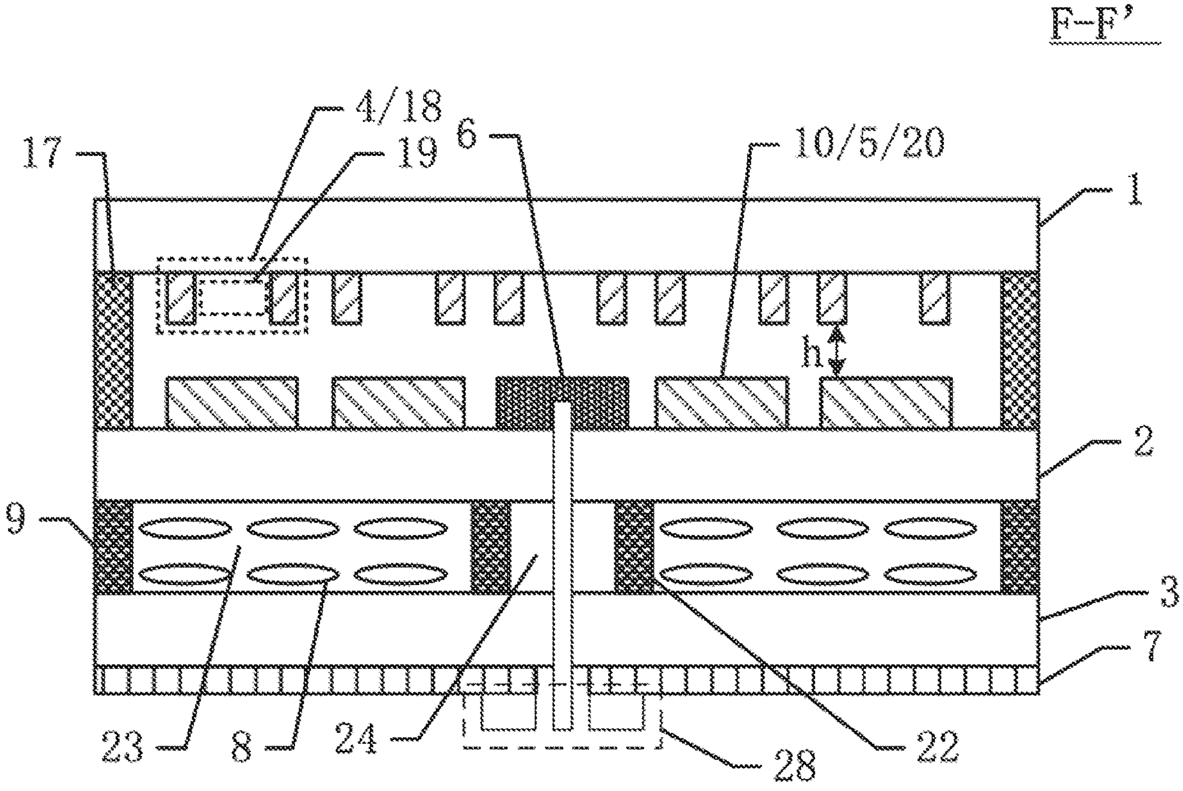
FIG. 23 illustrates a cross-sectional view along an F-F' direction in FIG. 22.
Figure 24:
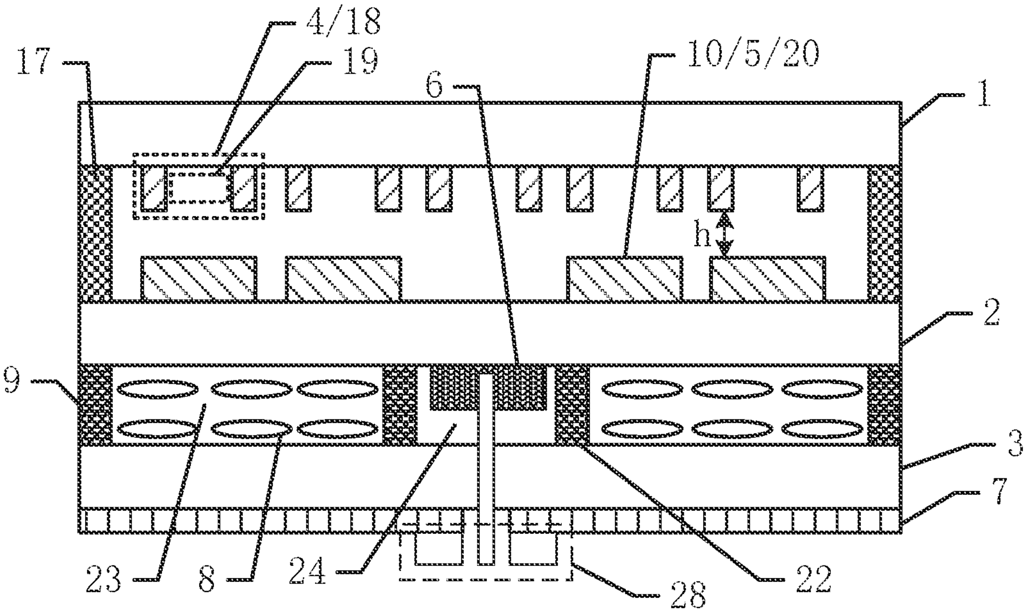
FIG. 24 illustrates another cross-sectional view along an F-F' direction in FIG. 22.

In some optional embodiments, referring to FIGS. 22-24, FIG. 22 illustrates another planar structural schematic of an antenna according to various embodiments of the present disclosure; FIG. 23 illustrates a cross-sectional view along an F-F' direction in FIG. 22; and FIG. 24 illustrates another cross-sectional view along the F-F' direction in FIG. 22. Along the direction perpendicular to the plane where the first substrate 1 is located, the first closed space 23 may surround the second space 24.

Optionally, the material of the support part 22 may be same as the material of the first frame adhesive 9, and the support part 22 may be disposed between the second substrate 2 and the third substrate 3 to form the second space 24.

In one embodiment, the second space 24 may be disposed in the middle of the antenna 100, that is, the first closed space 23 containing liquid crystal molecules 8 may surround the second space 24, such that the feed source 6 may be also in the middle of the antenna 100. After receiving the electromagnetic wave signal, the feed source 6 may diffuse and propagate the electromagnetic wave signal to the edge of the antenna 100 to facilitate propagation.

In FIG. 23, the feed source 6 may be on the side of the second substrate 2 adjacent to the first substrate 1, and the feed connector 28 may sequentially pass through the first electrode layer 7, the third substrate 3 and the second substrate 2 to realize electrical connection with the feed source 6. In FIG. 24, the feed source 6 may be on the side of the second substrate 2 away from the first substrate 1, the feed connector 28 may be electrically connected to the feed source 6 by only passing through the first electrode layer 7 and the third substrate 3, and holes may only need to be punched in the first electrode layer 7 and the third substrate 3.

Figure 25:
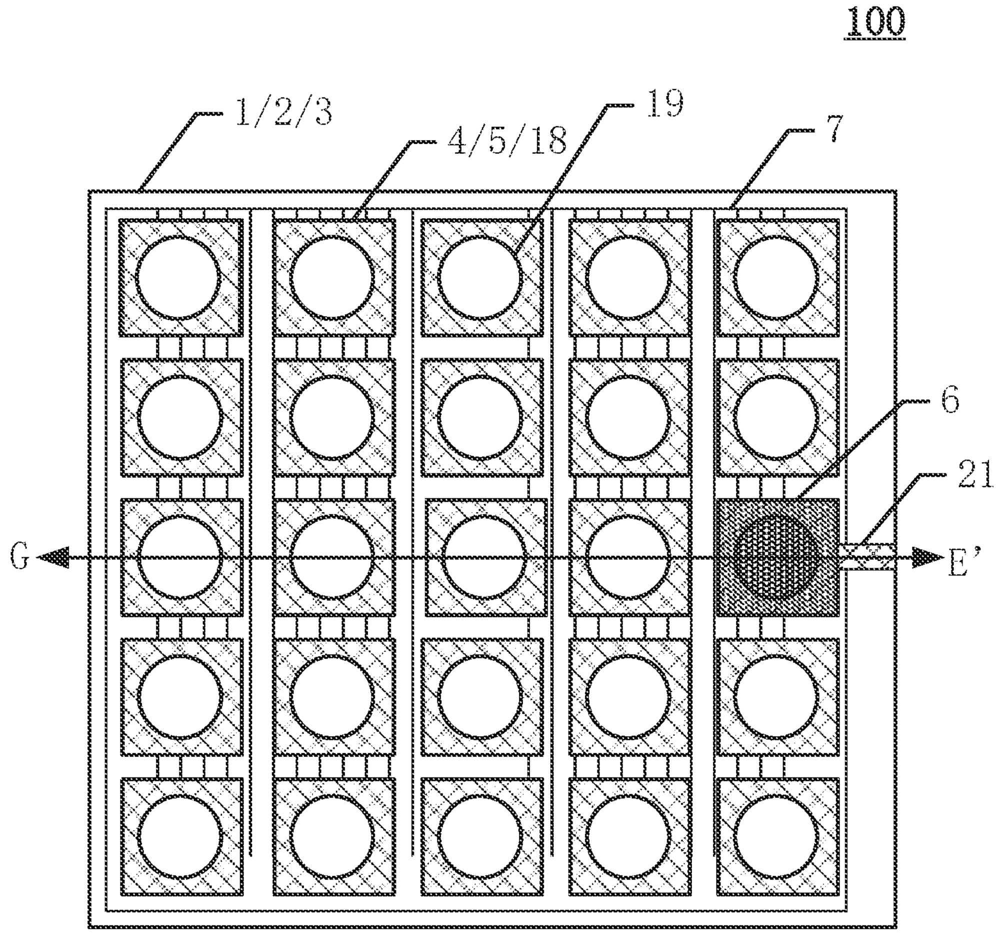
FIG. 25 illustrates another planar structural schematic of an antenna according to various embodiments of the present disclosure.
Figure 26:
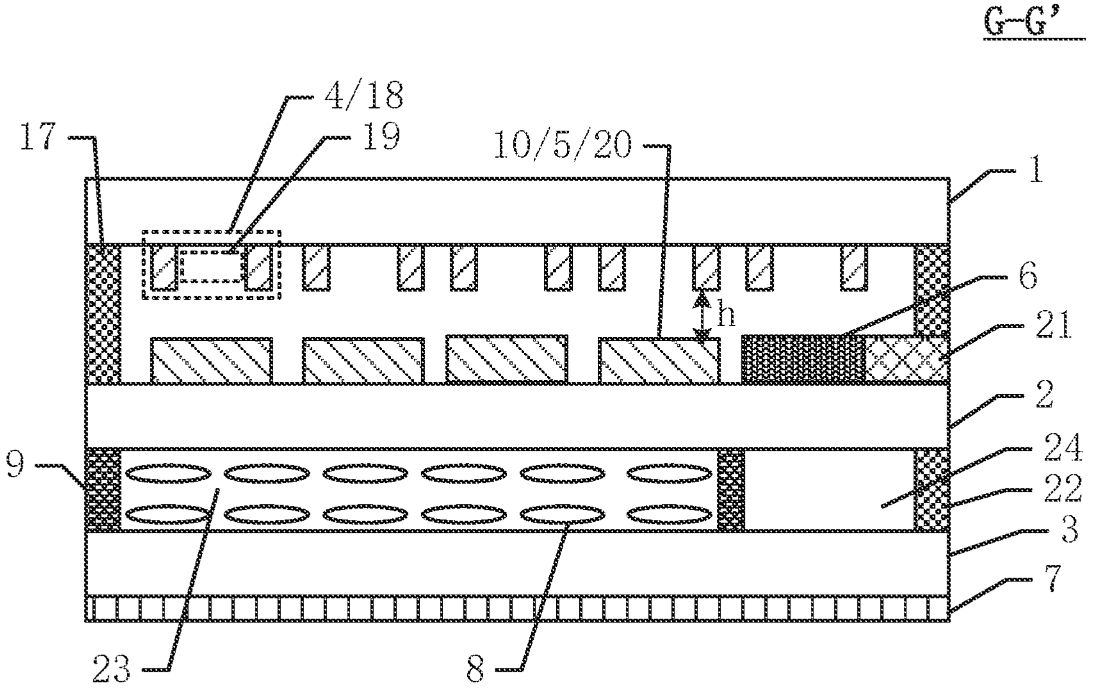
FIG. 26 illustrates a cross-sectional view along a G-G' direction in FIG. 25.

In some optional embodiments, referring to FIGS. 25-26, FIG. 25 illustrates another planar structural schematic of the antenna according to various embodiments of the present disclosure; and FIG. 26 illustrates a cross-sectional view along a G-G' direction in FIG. 25. The third substrate 3 may be on the side of the second substrate 2 away from the first substrate 1; and the first closed space 23 may be formed between the third substrate 3 and the second substrate 2 through the first frame adhesive 9 to accommodate the liquid crystal molecules 8.

The side of the third substrate 3 away from the second substrate 2 may include the first electrode layer 7 and also include the microstrip line 21; and the microstrip line 21 may be on a same layer as the feed source 6 and electrically connected to the feed source 6.

In one embodiment, the microstrip line 21 may be electrically connected to the feed source 6. As shown in FIG. 26, both the feed source 6 and the microstrip line 21 may be on the side of the second substrate 2 adjacent to the first substrate 1. Obviously, the feed source 6 and the microstrip line 21 may also be on the side of the second substrate 2 away from the first substrate 1, which may not be limited herein. In the present disclosure, the microstrip line 21 may be on a same layer as the feed source 6 and electrically connected to the feed source 6, such that the feed source 6 and the microstrip line 21 may be in direct contact and electrically connected with each other without coupling feed, and the feed efficiency may be higher. Obviously, since the feed source 6 and the microstrip line 21 are disposed on the same layer, there is no need to punch holes in the first electrode layer 7, the second substrate 2, and the third substrate 3, which may be simple in process and low in cost.

Figure 27:
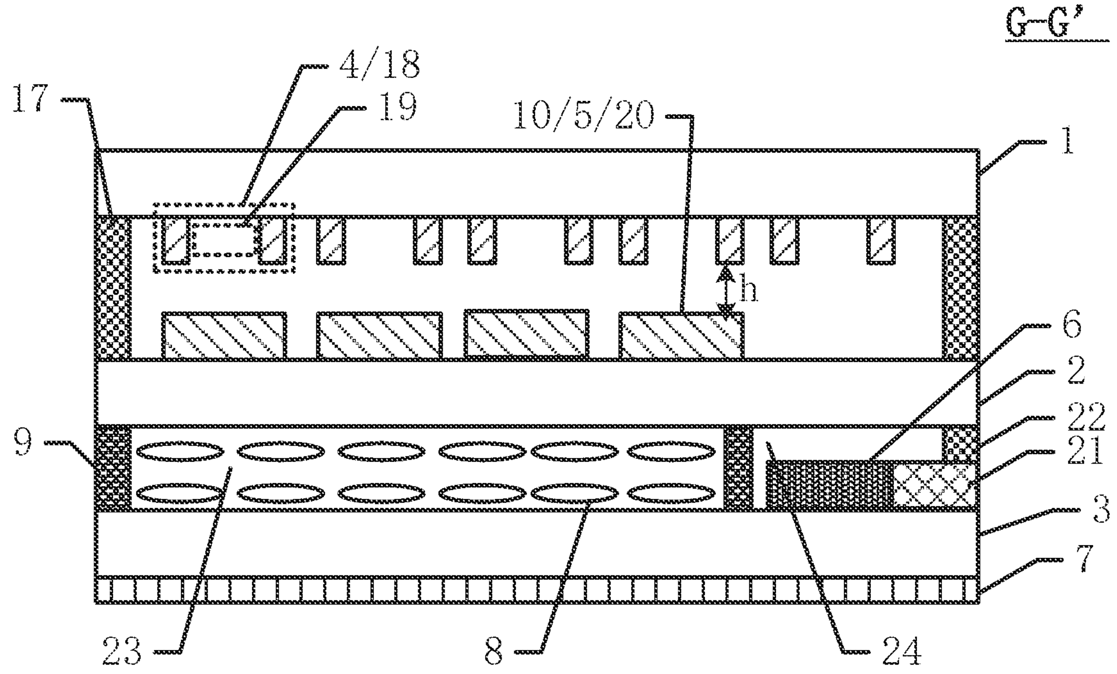
FIG. 27 illustrates another cross-sectional view along a G-G' direction in FIG. 25.

In some optional embodiments, referring to FIGS. 26-27, FIG. 27 illustrates another cross-sectional view along the G-G' direction in FIG. 25. The feed source 6 and the microstrip line 21 may be on the side of the second substrate 2 adjacent to the first substrate 1, or the feed source 6 and the microstrip line 21 may be on the side of the third substrate 3 adjacent to the second substrate 2.

FIG. 26 shows that the feed source 6 and the microstrip line 21 may be on the side of the second substrate 2 adjacent to the first substrate 1, and the microstrip line 21 may be on the same layer as the feed source 6 and electrically connected to the feed source 6. In such way, the feed source 6 and the microstrip line 21 may be in direct contact and electrically connected with each other without coupling feed, and the feed efficiency may be higher. Since the feed source 6 and the microstrip line 21 are disposed on the same layer, there is no need to punch holes in the first electrode layer 7, the second substrate 2, and the third substrate 3, which may be simple in process and low in cost.

FIG. 27 shows that the feed source 6 and the microstrip line 21 may be on the side of the third substrate 3 adjacent to the second substrate 2, and the microstrip line 21 may be on the same layer as the feed source 6 and electrically connected to the feed source 6. In such way, the feed source 6 and the microstrip line 21 may be in direct contact and electrically connected with each other without coupling feed, and the feed efficiency may be higher. Since the feed source 6 and the microstrip line 21 are disposed on the same layer, there is no need to punch holes in the first electrode layer 7 and the third substrate 3, which may be simple in process and low in cost.

It should be noted that in FIG. 27, along the direction perpendicular to the plane where the first substrate 1 is located, the electromagnetic band-gap structure 20 may not be overlapped with the feed source 6. That is, for the position corresponding to the second space 24, the electromagnetic band-gap structure 20 may not be disposed in the reflective layer 5. The electromagnetic band-gap structure 20 has reflective effect. If the electromagnetic band-gap structure 20 is overlapped with the feed source 6 along the direction perpendicular to the plane where the first substrate 1 is located, the electromagnetic wave emitted by the feed source 6 may be directly reflected back and cannot enter the first frequency selective surface 4, which may affect normal use of the antenna.

In some optional embodiments, referring to FIGS. 5, 9 and 17, the third substrate 3 may be on the side of the first substrate 1 away from the second substrate 2.

The first electrode layer 7 of the third substrate 3 may include the second frequency selective surface 25.

In FIGS. 5, 9 and 17, the side of the first substrate 1 away from the second substrate 2 may be disposed with the first frequency selective surface 4, the side of the second substrate 2 adjacent to the first substrate 1 may be disposed with the feed source 6, the third substrate 3 may be on the side of the first substrate 1 away from the second substrate 2, the side of the third substrate 3 adjacent to the second substrate 2 may include the first electrode layer 7, the first electrode layer 7 may include the semi-reflective semi-transparent second frequency selective surface 25, the resonant cavity may be formed between the first frequency selective surface 4 and the second frequency selective surface 25, and the liquid crystal molecules 8 may be between the second substrate 2 and the third substrate 3. After the feed source 6 receives the electromagnetic wave signal, the electromagnetic wave may emit from the feed source 6 to the second frequency selection surface 25, and the second frequency selection surface 25 has a semi-reflective semi-transparent effect. A part of the electromagnetic waves may be emitted from the second frequency selective surface 25 corresponding to the position of the feed source 6 and the other part of the electromagnetic waves may be reflected back to the first frequency selective surface 4. The first frequency selective surface 4 may also have reflective effect and reflect the other part of the electromagnetic waves back to the second frequency selective surface 25. In such way, the electromagnetic waves may be continuously reflected in the resonant cavity, and the electromagnetic waves transmitted through the second frequency selective surface 25 may be superimposed in phase each time, thereby increasing the gain of the antenna 100 and sharpening the beam width. The present disclosure may also include the liquid crystal molecules 8 between the third substrate 3 and the first substrate 1. When a voltage difference is between the first electrode layer 7 and the first frequency selective surface 4 to form an electric field, the liquid crystal molecules 8 may be deflected. Since the deflection degrees of the liquid crystal molecules 8 varies with the applied voltage, the dielectric constant of the liquid crystal molecules 8 between the second frequency selective surface 25 and the first frequency selective surface 4 may be controlled to be adjusted. Therefore, equivalent dielectric constant of the first frequency selective surface 4 may be controlled to be adjusted, such that the reflective phase φ2 of the first frequency selective surface 4 may be adjusted. The resonance condition is:

$$\frac{4\pi}{\lambda}\cdot h\cdot\cos\theta-\Phi1-\Phi2=0$$

where λ is the working wavelength; h is the height of the resonant cavity; θ is the beam pointing; φ1 is the reflective phase of the upper reflective plate; φ2 is the reflective phase of the lower reflective plate. It may be seen that when the height h of the resonant cavity remains unchanged and φ2 is adjustable, resonance adjustment may be satisfied by only adjusting the working wavelength and beam pointing. The working wavelength λ may be adjustable. The working frequency is equal to the reciprocal of the working wavelength, such that the working frequency may be adjustable; and the beam pointing θ may be also adjustable. Therefore, the adjustment of the working frequency and the beam pointing of the antenna 100 may be realized, such that the working mode of the antenna 100 may be no longer fixed with more flexible application.

It should be noted that, in one embodiment, the liquid crystal molecules 8 may be arranged between the first substrate 1 and the third substrate 3, such that a deflection voltage capable of driving the liquid crystal molecules 8 may need to be applied to the second frequency selective surface 25 and the first frequency selective surface 4, and the deflected liquid crystal molecules 8 may change the dielectric constant of the first frequency selective surface 4. In some optional embodiments, a circuit board (not shown in drawings) may be bound on the third substrate 3, and the bias voltage may be transmitted through a one-to-one electrical connection between the second frequency selection surface 25 and the signal line.

In some optional embodiments, both the first frequency selective surface 4 and the second frequency selective surface 25 may be groove-type frequency selective surfaces, or the first frequency selective surface 4 may be the patch type and the second frequency selective surface 25 may be the groove type, which may not be limited herein.

In some optional embodiments, referring to FIGS. 5 and 9, the reflective layer 5 may include the second electrode layer 26, the second electrode layer 26 may include the feed hole 27, the side of the second electrode layer 26 away from the first substrate 1 may further include the feed connector 28, and the feed connector 28 may be electrically connected to the feed source 6 through the feed hole 27; and the feed connector 28 may include a radio frequency terminal 29 and a ground terminal 30, the radio frequency terminal 29 may be electrically connected to the feed source 6, and the ground terminal 30 may be electrically connected to the second electrode layer 26.

It may be understood that the feed connector 28 may be disposed in the present disclosure, and direct feeding may be between the feed connector 28 and the feed source 6 with high feed efficiency.

The feed connector 28 may include the radio frequency terminal 29 and the ground terminal 30. However, the radio frequency terminal 29 may need to pass through the second electrode layer 26 and the second substrate 2 to be directly connected to the feed source 6 to realize direct feed. The ground terminal 30 may be electrically connected to the second electrode layer 26, such that the second electrode layer 26 may be grounded.

In some optional embodiments, referring to FIG. 17, the feed source 6 may be on the side of the second substrate 2 adjacent to the first substrate 1.

The reflective layer 5 may include the second electrode layer 26, the second electrode layer 26 may include the feed hole 27, the side of the second electrode layer 26 away from the first substrate 1 may further include the microstrip line 21, and along the direction perpendicular to the plane where the first substrate 1 is located, the feed source 6, the feed hole 27 and the microstrip line 21 may be at least partially overlapped to each other.

As shown in FIG. 17, the microstrip line 21 may be on the side of the second electrode layer 26 away from the first substrate 1, where the second electrode layer 26 may be a ground layer. The second electrode layer 26 may include the feed hole 27, and the microstrip line 21 may feed the electromagnetic waves to the feed source 6 by means of coupling feed. In one embodiment, an insulating layer may be between the second electrode layer 26 and the microstrip line 21 to avoid signal interference.

In one embodiment, coupling feed may be performed through the microstrip line 21 without punching holes in the second substrate 2, which may be simple in process and low in cost.

Figure 28:
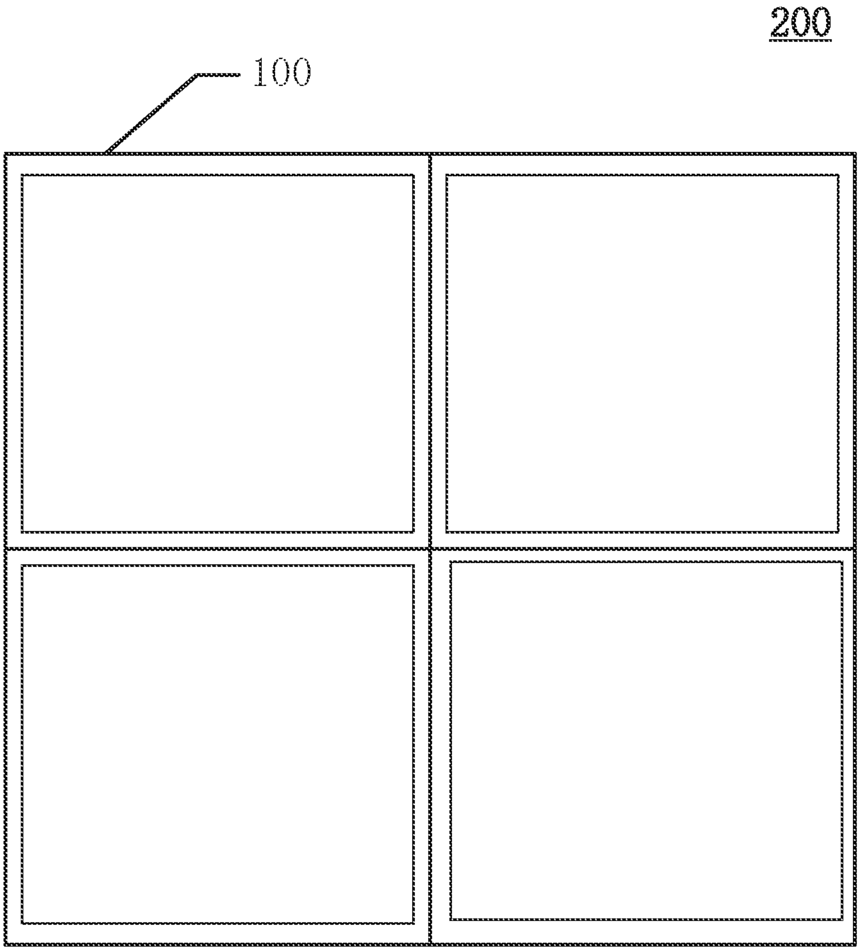
FIG. 28 illustrates a planar structural schematic of an antenna group according to various embodiments of the present disclosure.

Based on the idea of the same aspect, the present disclosure further provides an antenna group 200. Referring to FIG. 28, FIG. 28 illustrates a planar structural schematic of an antenna group according to various embodiments of the present disclosure. The antenna group 200 in one embodiment may include the antenna 100 of any of above-mentioned embodiments. In FIG. 28, the antenna group 200 may be formed by splicing four antennas 100 merely as an example for illustration. Obviously, the number of antennas 100 in the antenna group 200 may not be limited herein. Pattern filling may not be performed on the antenna 100 in FIG. 28. When the antenna group 200 of the present disclosure includes the antenna 100 provided in above-mentioned embodiment, the antenna group 200 may have the beneficial effect of the above-mentioned antenna 100.

Figure 29:
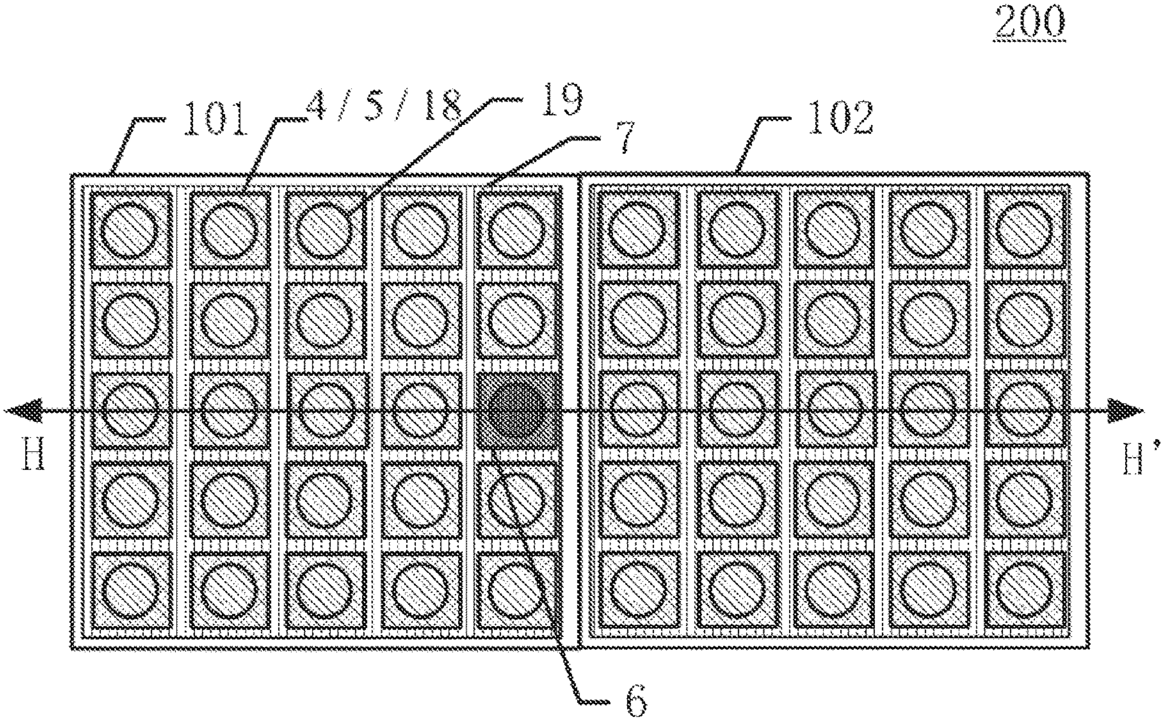
FIG. 29 illustrates another planar structural schematic of an antenna group according to various embodiments of the present disclosure.
Figure 30:
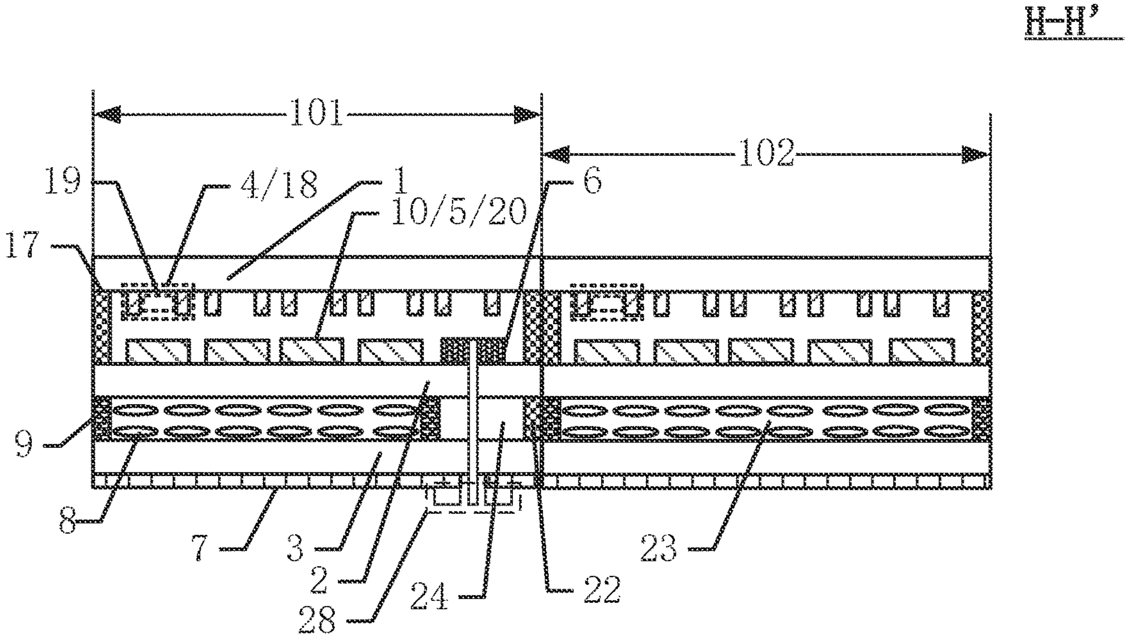
FIG. 30 illustrates a cross-sectional view along an H-H' direction in FIG. 29.

Based on the idea of the same aspect, the present disclosure further provides an antenna group 200. Referring to FIGS. 29-30, FIG. 29 illustrates another planar structural schematic of an antenna group according to various embodiments of the present disclosure; and FIG. 30 illustrates a cross-sectional view along an H-H' direction in FIG. 29. The antenna group 200 in one embodiment may at least include a first antenna 101 and a second antenna 102 which are adjacent to each other. The first antenna 101 may be the antenna 100 in FIGS. 19, 20 and 21, and the second antenna 102 may have no feed source 6 and share the feed source 6 of the first antenna 101. In FIG. 29, the antenna group 200 may only have one first antenna 101 and one second antenna 102 as an example for illustration. Obviously, the antenna group may also include multiple first antennas 101 and multiple second antennas 102, which may not be limited herein.

In some optional embodiments, referring to FIG. 30, in the second antenna 102, the first closed space 23 may only be formed between the second substrate 2 and the third substrate 3 without using the support part 22 to form the second space 24. As mentioned above, along the direction perpendicular to the plane of the first substrate 1, the feed source 6 may be in the second space 24 along the direction perpendicular to the plane of the first substrate 1. Since there is no feed source 6 in the second antenna 102 in one embodiment, there is no need to configure the second space 24.

In one embodiment, the feed source 6 of the first antenna 101 may be at the edge. Therefore, when the first antenna 101 is spliced with the second antenna 102 to form the antenna group 200, the feed source 6 may be between the first antenna 101 and the second antenna 102, such that there is no need to dispose the feed source 6 on the second antenna 102, and the second antenna 102 may share the feed source 6 with the first antenna 101. In such way, one feeder 6 may be reduced in the antenna group 200, which can reduce the cost and the feed complexity.

Figure 33:
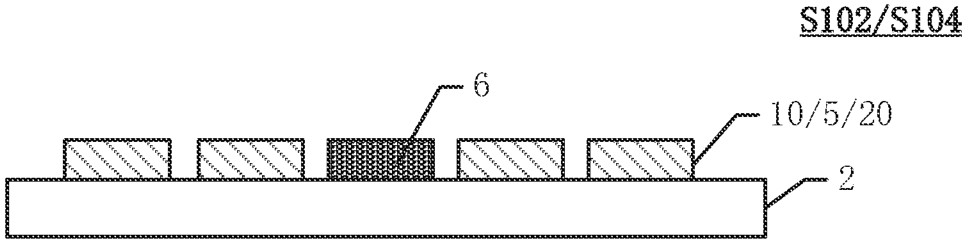
FIG. 33 illustrates a cross-sectional view corresponding to S102.
Figure 34:
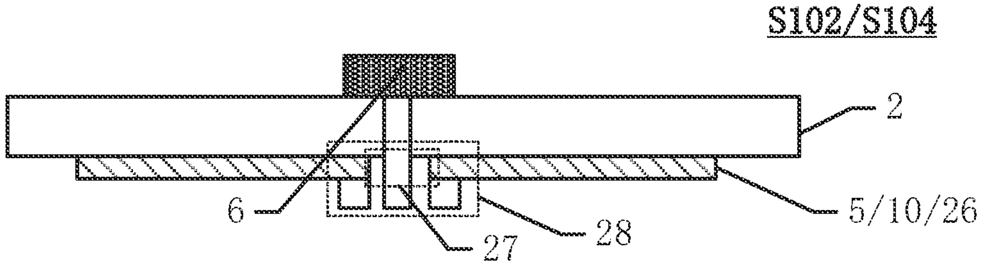
FIG. 34 illustrates another cross-sectional view corresponding to S102.
Figure 35:
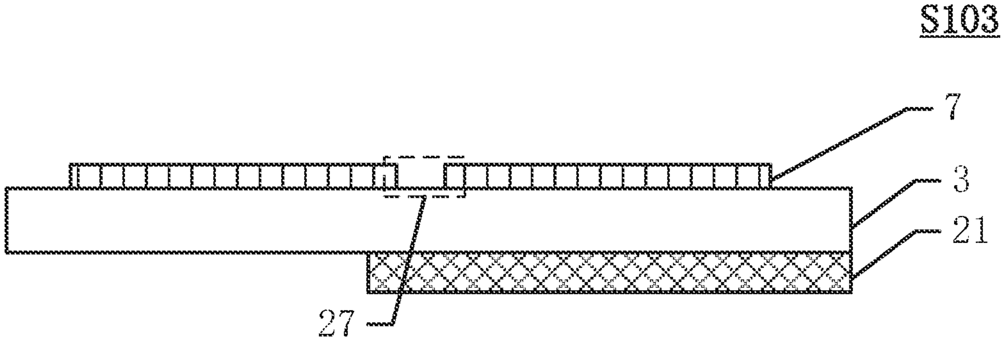
FIG. 35 illustrates a cross-sectional view corresponding to S103.
Figure 36:
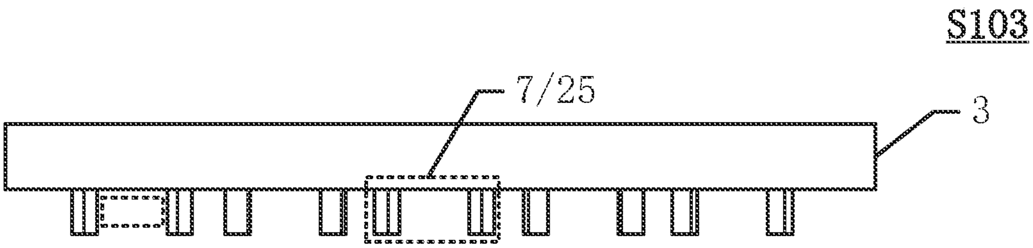
FIG. 36 illustrates another cross-sectional view corresponding to S103.

The present disclosure further provides a formation method of the antenna 100. Referring to FIGS. 2-5 and 31-36, FIG. 31 illustrates a flowchart of a formation method of an antenna according to various embodiments of the present disclosure; FIG. 32 illustrates a cross-sectional view corresponding to S101; FIG. 33 illustrates a cross-sectional view corresponding to S102; FIG. 34 illustrates another cross-sectional view corresponding to S102; FIG. 35 illustrates a cross-sectional view corresponding to S103; and FIG. 36 illustrates another cross-sectional view corresponding to S103. As shown in FIG. 31, the formation method of the antenna in the present disclosure may include the following exemplary steps.

At S101, the first substrate 1 may be provided, and the first frequency selective surface 4 may be formed on the side of the first substrate 1.

At S102, the second substrate 2 may be provided, and the reflective layer 5 may be formed on the side of the second substrate 2.

At S103, the third substrate 3 may be provided, and the first electrode layer 7 may be formed on the side of the third substrate 3.

At S104, the feed source 6 may be formed on the side of the second substrate 2 or the third substrate 3.

At S105, the liquid crystal cell may be formed, including forming the closed space between the third substrate 3 and the second substrate 2 to accommodate the liquid crystal molecules 8 through the frame adhesive; or forming the closed space between the third substrate 3 and the first substrate 1 to accommodate the liquid crystal molecules 8 through the frame adhesive.

For example, the order of S101, S102, S103, and S104 may not be limited, and may be adjusted according to needs.

At S101, the first frequency selective surface 4 may be formed on the side of the first substrate 1. For example, the first frequency selective surface 4 may be formed on the first surface 1001 of the first substrate 1. The first surface 1001 may be a surface adjacent to the second substrate 2 (referring to FIG. 3). Obviously, the first frequency selective surface 4 may also be formed on the second surface 1002 of the first substrate 1. The second surface 1002 may be a surface away from the second substrate 2 (referring to FIG. 8). The plurality of first frequency selective surfaces 4 may be formed by a cutting manner. Referring to FIG. 32, FIG. 32 is a cross-sectional view corresponding to S101. In FIG. 32, the first frequency selective surface 4 may be on the first surface 1001 of the first substrate 1 merely as an example for illustration.

At S102, the reflective layer 5 may be formed on the side of the second substrate 2, where the reflective layer 5 may be a ground layer or an electromagnetic band-gap structure 20.

In embodiments in FIGS. 2 and 3, FIG. 33 is a cross-sectional view corresponding to S102. In FIG. 33, the reflective layer 5 may be an electromagnetic band-gap structure 20. Optionally, while forming the electromagnetic band-gap structure 20, S104 may also be performed simultaneously, that is, the feed source 6 may be formed on the second substrate 2. The feed source 6 may be on the side of the second substrate 2 adjacent to the first substrate 1 or may be on the side of the second substrate 2 away from the first substrate 1. In FIG. 33, the electromagnetic band-gap structure 20 and the feed source 6 may be on the side of the second substrate 2 adjacent to the first substrate 1 merely as an example for illustration. The electromagnetic band-gap structure 20 may be formed by a cutting manner.

In embodiments in FIGS. 4 and 5, FIG. 34 is another cross-sectional view corresponding to S102. In FIG. 34, the reflective layer 5 may be a ground layer. Then S104 may be performed, and the feed source 6 and the reflective layer 5 may be disposed on two sides of the second substrate 2. Obviously, if the feed connector 28 needs to be electrically connected to the feed source 6 subsequently, holes may need to be punched on the second substrate 2 and the reflective layer 5, which may be configured to electrically connect the radio frequency terminal 29 of the feed connector 28 to the feed source 6.

At S103, in embodiments shown in FIGS. 2 and 3, the first electrode layer 7 may be formed on the side of the third substrate 3. The first electrode layer 7 may be a ground layer. An electric field for driving the liquid crystal molecules 8 to be deflected may be formed between the ground layer and the electromagnetic band-gap structure 20. Obviously, in embodiments shown in FIGS. 2 and 3, coupling feed may be needed between the microstrip line 21 and the feed source 6 subsequently, such that a hole may need to be punched in the first electrode layer 7 to form the feed hole 27. Referring to FIG. 35, FIG. 35 is a cross-sectional view corresponding to S103, and the microstrip line 21 may be shown in FIG. 35.

In embodiments in FIGS. 4 and 5, FIG. 36 is another cross-sectional view corresponding to S103. In one embodiment, the reflective layer 5 may include the second frequency selective surface 25, and the second frequency selective surface 25 may be formed by a cutting manner. The second frequency selective surface 25 may be on the side of the third substrate 3 adjacent to the first substrate 1 or may be on the side of the third substrate 3 away from the first substrate 1. In FIG. 36, the second frequency selective surface 25 may be on the side of the third substrate 3 adjacent to the first substrate 1 merely as an example for illustration.

At S105, the liquid crystal cell may be formed. In embodiments shown in FIGS. 2 and 3, the closed space may be formed between the third substrate 3 and the second substrate 2 to accommodate the liquid crystal molecules 8 through the frame adhesive. In embodiments shown in FIGS. 4 and 5, the closed space may be formed between the third substrate 3 and the first substrate 1 to accommodate the liquid crystal molecules 8 through the frame adhesive. S105 may refer to FIGS. 2 to 5, and the cross-sectional views may not be provided separately herein.

In some optional embodiments, referring to FIGS. 4-5, 34 and 36, forming the first electrode layer 7 on the side of the third substrate 3 may include forming the second frequency selective surface 25 on the side of the third substrate 3.

Providing the second substrate 2, forming the reflective layer 5 on the side of the second substrate 2 and forming the feed source 6 on the side of the second substrate 2 may include forming the feed source 6 on the side of the second substrate 2, forming the second electrode layer 26 on the other side of the second substrate 2, etching the feed hole 27 from the second electrode layer 26, and providing the feed connector 28 where the feed connector 28 may pass through the second substrate 2 and be electrically connected to the feed source 6.

For example, in embodiments shown in FIGS. 4 and 5, the second frequency selective surface 25 may need to be formed on the side of the third substrate 3. In addition, in one embodiment, the feeding may be performed through the feed connector 28, which may improve the feed efficiency. Therefore, the feed source 6 may need to be formed on the side of the second substrate 2, and the second electrode layer 26 may be formed on the other side of the second substrate 2. The second electrode layer 26 may be etched to form the feed hole 27, and the second substrate 2 may be electrically connected to the feed source 6 through passing through the feed connector 28.

In some optional embodiments, referring to FIGS. 25-27, the third substrate 3 may be on the side of the second substrate 2 away from the first substrate 1, the second space 24 may be formed between the third substrate 3 and the second substrate 2 through the support part 22, and along the direction perpendicular to the plane where the first substrate 1 is located, the feed source 6 may be overlapped with the second space 24; and the microstrip line 21 may be formed, such that the microstrip line 21 may be on the same layer as the feed source 6 and electrically connected to the feed source 6.

In one embodiment, the second space 24 may be formed between the third substrate 3 and the second substrate 2 through the support part; the second space 24 may be overlapped with the feed source 6 along the direction perpendicular to the plane where the first substrate 1 is located; and by forming the microstrip line 21 on the same layer as the feed source 6, the microstrip line 21 may be directly and electrically connected to the feed source 6 without coupling feed, thereby increasing feed efficiency.

It may be seen from above-mentioned embodiments that the antenna and its formation method, and the antenna group provided by the present disclosure at least achieve the following beneficial effects.

The present disclosure provides the antenna including the first substrate, the second substrate and the third substrate. The first substrate may be disposed opposite to the second substrate, and the side of the first substrate may include the first frequency selective surface. The side of the second substrate may include the reflective layer, and the first distance may be between the first frequency selective surface and the reflective layer along the direction perpendicular to the plane where the first substrate is located. The side of the third substrate may include the first electrode layer; the antenna may further include the feed source; and the feed source may be on the side of the second substrate or on the side of the third substrate.

When the third substrate is on the side of the second substrate away from the first substrate and the liquid crystal molecules are between the second substrate and the third substrate, the resonant cavity may be formed between the first frequency selective surface and the reflective layer. After the feed source receives the electromagnetic wave signal, the electromagnetic waves may emit from the feed source to the first frequency selective surface. The first frequency selective surface has semi-reflective and semi-transparent effect. A part of the electromagnetic waves may emit from the first frequency selective surface corresponding to the position of the feed source, and the other part of the electromagnetic waves may be reflected back to the reflective layer. The reflective layer has reflective effect and reflect the other part of the electromagnetic waves back to the first frequency selective surface. In such way, the electromagnetic waves may be continuously reflected in the resonant cavity, and the electromagnetic waves transmitted through the first frequency selective surface of the upper layer may be superimposed in phase each time, thereby improving the antenna gain and sharpening the beam width. The liquid crystal molecules may be between the second substrate and the third substrate, and the first electrode layer may be disposed on the side of the third substrate adjacent to the second substrate. When a voltage difference is between the reflective layer and the first electrode layer to form an electric field, the liquid crystal molecules may be deflected. Since the deflection degrees of the liquid crystal molecules varies with the applied voltage, the dielectric constant of the liquid crystal molecules between the reflective layer and the first electrode layer may be controlled to be adjusted. The equivalent dielectric constant of the reflective layer structure may be controlled to be adjusted, such that the reflective phase φ2 of the reflective layer may be adjusted. The resonance condition is:

$$\frac{4\pi}{\lambda}\cdot h\cdot\cos\theta-\Phi 1-\Phi 2=0$$

where λ is the working wavelength; h is the height of the resonant cavity; θ is the beam pointing; φ1 is the reflective phase of the upper reflective plate; φ2 is the reflective phase of the lower reflective plate. It may be seen that when the height h of the resonant cavity remains unchanged and φ2 is adjustable, resonance adjustment may be satisfied by only adjusting the working wavelength and beam pointing. The working wavelength λ may be adjustable. The working frequency is equal to the reciprocal of the working wavelength, such that the working frequency may be adjustable; and the beam pointing θ may be also adjustable. Therefore, the adjustment of the working frequency and the beam pointing of the antenna may be realized, such that the working mode of the antenna may be no longer fixed with more flexible application.

When the third substrate is on the side of the first substrate away from the second substrate and the liquid crystal molecules are between the third substrate and the first substrate, the resonant cavity may be formed between the first frequency selective surface and the first electrode layer. After the feed source receives the electromagnetic wave signal, the electromagnetic waves may emit from the feed source to the first electrode layer. A part of the electromagnetic waves may be emitted from the surface of the first electrode layer corresponding to the position of the feed source, and the other part of the electromagnetic waves may be reflected back to the first frequency selective surface. The first frequency selective surface also has reflective effect and reflect the other part of the electromagnetic waves back to the first electrode layer. In such way, the electromagnetic waves may be continuously reflected in the resonant cavity, and the electromagnetic waves transmitted through the surface of the first electrode layer on the upper layer may be superimposed in phase each time, thereby improving the antenna gain and sharpening the beam width. The liquid crystal molecules may be between the third substrate and the first substrate. When a voltage difference is between the first electrode layer and the first frequency selective surface to form an electric field, the liquid crystal molecules may be deflected. Since the deflection degrees of the liquid crystal molecules varies with the applied voltage, the dielectric constant of the liquid crystal molecules between the first electrode layer and the first frequency selective surface may be controlled to be adjusted. The equivalent permittivity of the first frequency selective surface may be adjusted controllably, such that the reflective phase φ2 of the first frequency selective surface may be adjusted. According to the resonance condition:

$$\frac{4\pi}{\lambda}\cdot h\cdot\cos\theta-\Phi 1-\Phi 2=0$$

where λ is the working wavelength; h is the height of the resonant cavity; θ is the beam pointing; φ1 is the reflective phase of the upper reflective plate; φ2 is the reflective phase of the lower reflective plate. It may be seen that when the height h of the resonant cavity remains unchanged and φ2 is adjustable, resonance adjustment may be satisfied by only adjusting the working wavelength and beam pointing. The working wavelength λ may be adjustable. The working frequency is equal to the reciprocal of the working wavelength, such that the working frequency may be adjustable; and the beam pointing θ may be also adjustable. Therefore, the adjustment of the working frequency and the beam pointing of the antenna may be realized, such that the working mode of the antenna may be no longer fixed with more flexible application.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. An antenna, comprising:

a first substrate, a second substrate and a third substrate, wherein:

the first substrate and the second substrate are oppositely disposed; and a first frequency selective surface is on a side of the first substrate;

a reflective layer is on a side of the second substrate; along a direction perpendicular to a plane of the first substrate, a first distance is between the first frequency selective surface and the reflective layer; and a first electrode layer is on a side of the third substrate; and the third substrate is on a side of the first substrate away from the second substrate, and liquid crystal molecules are between the third substrate and the first substrate; and a feed source, wherein the feed source is on a side of the second substrate opposite the reflective layer.

2. The antenna according to claim 1, wherein:

the first frequency selective surface is on a side of the first substrate adjacent to the second substrate, or the first frequency selective surface is on the side of the first substrate away from the second substrate; and the reflective layer is on the side of the second substrate away from the first substrate.

3. The antenna according to claim 1, wherein:

a first circuit board is bound to the side of the second substrate; and the reflective layer is electrically connected to the first circuit board through first signal lines.

4. The antenna according to claim 1, wherein:

the first frequency selective surface includes a plurality of second electrode blocks; a gap is between adjacent second electrode blocks; and the plurality of second electrode blocks include through holes passing through the plurality of second electrode blocks.

5. An antenna comprising:

a first substrate, a second substrate and a third substrate, wherein:

the first substrate and the second substrate are oppositely disposed; and a first frequency selective surface is on a side of the first substrate;

a reflective layer is on a side of the second substrate;

along a direction perpendicular to a plane of the first substrate, a first distance is between the first frequency selective surface and the reflective layer; and a first electrode layer is on a side of the third substrate; and the third substrate is on a side of the first substrate away from the second substrate, and liquid crystal molecules are between the third substrate and the first substrate;

a feed source, wherein the feed source is on a side of the second substrate opposite the reflective layer; and the first electrode layer of the third substrate includes a second frequency selective surface.

6. The antenna according to claim 5, wherein:

the reflective layer includes a second electrode layer; and the second electrode layer includes a feed hole; and a feed connector is further on a side of the second electrode layer away from the first substrate; the feed connector passes through the feed hole to be electrically connected to the feed source; the feed connector includes a radio frequency terminal and a ground terminal; and the radio frequency terminal is electrically connected to the feed source, and the ground terminal is electrically connected to the second electrode layer.

7. The antenna according to claim 5, wherein:

the feed source is on a side of the second substrate adjacent to the first substrate;

the reflective layer includes a second electrode layer; and the second electrode layer includes a feed hole;

a microstrip line is further on the side of the second electrode layer away from the first substrate; and along the direction perpendicular to the plane of the first substrate, the feed source, the feed hole and the microstrip line are at least partially overlapped with each other.

8. An antenna group, comprising:

an antenna, comprising:

a first substrate, a second substrate and a third substrate, wherein:

the first substrate and the second substrate are oppositely disposed; and a first frequency selective surface is on a side of the first substrate;

a reflective layer is on a side of the second substrate; along a direction perpendicular to a plane of the first substrate, a first distance is between the first frequency selective surface and the reflective layer; and a first electrode layer is on a side of the third substrate; and the third substrate is on a side of the first substrate away from the second substrate, and liquid crystal molecules are between the third substrate and the first substrate; and a feed source, wherein the feed source is on a side of the second substrate opposite the reflective layer.

* * * * *